US008467101B2

(12) United States Patent
Sugiyama

(10) Patent No.: US 8,467,101 B2
(45) Date of Patent: Jun. 18, 2013

(54) IMAGE FORMING APPARATUS FOR ADJUSTING DOT SIZE

(75) Inventor: Yasuhisa Sugiyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 964 days.

(21) Appl. No.: 12/238,058

(22) Filed: Sep. 25, 2008

(65) Prior Publication Data

US 2009/0086245 A1 Apr. 2, 2009

(30) Foreign Application Priority Data

Sep. 28, 2007 (JP) ................................ 2007-256569

(51) Int. Cl.
*G06K 15/00* (2006.01)
*G03G 13/04* (2006.01)
*G03G 15/00* (2006.01)

(52) U.S. Cl.
USPC ........... 358/3.12; 358/1.9; 358/1.2; 358/3.13; 358/3.26; 358/535; 358/538; 358/3.1; 347/131; 347/188; 347/232; 347/251; 347/252; 347/254; 399/27; 399/31; 399/39; 399/61; 399/64; 399/112; 399/119; 399/131; 399/138; 399/152

(58) Field of Classification Search
None
See application file for complete search history.

(56) References Cited

U.S. PATENT DOCUMENTS 4,491,875 A * 1/1985 Kawamura .................... 358/3.1
4,739,377 A 4/1988 Allen
5,722,003 A * 2/1998 Suzuki et al. .................. 399/39
5,805,192 A * 9/1998 Sasaki et al. .................. 347/131
5,852,462 A * 12/1998 Lloyd et al. .................. 347/156
6,204,873 B1 * 3/2001 Shimazaki .................... 347/172
6,288,733 B1 9/2001 Nakazawa et al.
6,714,225 B2 * 3/2004 Mutou et al. .................. 347/131
6,879,336 B2 * 4/2005 Sugiyama et al. ............ 347/262
7,215,896 B2 * 5/2007 Yamada et al. ................. 399/49
7,316,473 B2 * 1/2008 Matsuzawa et al. .......... 347/100
7,548,340 B2 * 6/2009 Ishikawa et al. ............... 358/1.9
7,654,463 B2 * 2/2010 Mitamura ................ 235/472.03

FOREIGN PATENT DOCUMENTS

JP 63-280275 11/1988
JP 08-289153 11/1996
JP 10-145598 5/1998
JP H11-230031 8/1999
JP 2001-051459 2/2001
JP 2003-280452 10/2003
JP 2006-251389 A 9/2006
JP 2007-011007 A 1/2007
JP 2007-199474 A 8/2007
JP 2008-219176 A 9/2008

* cited by examiner

*Primary Examiner* — Steven Kau
(74) *Attorney, Agent, or Firm* — Rabin & Berdo, P.C.

(57) ABSTRACT

An image forming device includes a density detector that detects image density, and a memory that stores information relating image density to dot size. When a dot size is specified, the image forming device automatically obtains the corresponding image density from the information in the memory, prints a test pattern, compares its density with the density corresponding to the specified dot size, and adjusts an image forming parameter until the density corresponding to the specified dot size is obtained. Dot size can be accurately adjusted in this way without the need for elaborate measuring equipment. In particular, the size of dots used to embed invisible information in images can be accurately controlled.

25 Claims, 19 Drawing Sheets

40% DUTY

60% DUTY

IMAGE FORMING APPARATUS FOR ADJUSTING DOT SIZE

BACKGROUND OF THE INVENTION

1. Field of the Invention

The present invention relates to an image forming apparatus.

2. Description of the Related Art

Conventional printers, copiers, facsimile machines, and other such image forming apparatus, specifically printers, for example, are adapted to form images on the basis of parameters specifying various image forming conditions. These parameters are normally optimized by modifying preset base values according to the number of pages that have been printed, the type of paper being used as the printing medium, environmental factors, and so on. The base values and correction formulas are derived empirically, by experiments conducted by the manufacturer.

Image density is a factor that particularly needs to be regulated because of its strong effect on image quality. In Japanese Patent Application Publication No. 2001-051459, Endo discloses an image formation device that transfers certain patterns onto an intermediate transfer body, uses a density sensor to measure the density of the transferred patterns, detects aging changes in the image formation device on the basis of the measured image density, and makes compensating adjustments that maintain a uniform image density.

The density sensor employed by Endo, however, only obtains the average density of the measurable image area, so while it can be used to improve average overall image density, it cannot accurately measure image density at the scale of individual dots. Image density at this scale becomes important when a printer is used to print barcodes, watermarks, and other patterns consisting of extremely fine lines or ultra-small dots that must be reproduced accurately on a scale of a few tens of micrometers (a few hundredths of a millimeter).

A direct way of meeting this requirement would be to print a test image including fine lines and ultra-small dots, use a special instrument with microscopic optical resolution to scan the printed image and measure the dimensions or of these features, and adjust the printing parameters until the desired dimensions are obtained, but this would be a troublesome procedure entailing separate scanning, measurement, and adjustment processes that could not easily be automated, and would require expensive extra equipment not normally provided as part of a printer.

The problem becomes particularly difficult when the barcode, watermark, or other pattern is printed with an invisible toner or ink and embedded in a visible image on the same sheet of paper. Such invisible patterns are read by special scanners sensitive to a restricted range of wavelengths of light. Accurate adjustment by the above direct method would require the use of a special measuring instrument with matching spectral sensitivity, and it would also be necessary to contend with the presence of colorant in the invisible printing agent. If the dot size of the invisible pattern is not accurately adjusted, the embedded pattern may fail to perform its function because the intended scanner cannot recognize the pattern.

SUMMARY OF THE INVENTION

It is an aspect of the present invention is to provide an image forming apparatus in which dot size can be accurately adjusted.

Another aspect of the invention is to provide an image forming apparatus in which the procedure for adjusting the dot size is simplified.

Another aspect is to provide an image forming apparatus that can embed accurately recognizable identification information in a visible image formed on the same medium.

According to an aspect of the invention, an image forming device includes an input unit for input of dot information concerning size of dots, a memory unit storing a test pattern and information relating a reference density to the dot information, an image forming unit for forming an image of the test pattern according to the dot information input by the input unit, and a density detector for detecting the density of the image formed by the image forming unit.

The image forming device also has a processing unit that obtains the reference density corresponding to the dot information input by the input unit from the information stored in the memory unit, performs a comparison of the reference density with the density detected by the density detector, and adjusts a parameter that controls the density of the image formed by the image forming unit according to the result of the comparison.

The information relating the reference density to the dot information can be obtained in advance, using accurate measuring instruments. The processing unit can then adjust the parameter to obtain dots of the desired size accurately without having the measure the dot size directly. The adjustment process is moreover completely automatic.

When an invisible identification image is embedded in a main image, the size of the dots used to form the identification image can be independently adjusted for accurate readability.

DETAILED DESCRIPTION OF THE INVENTION

Figure 1:
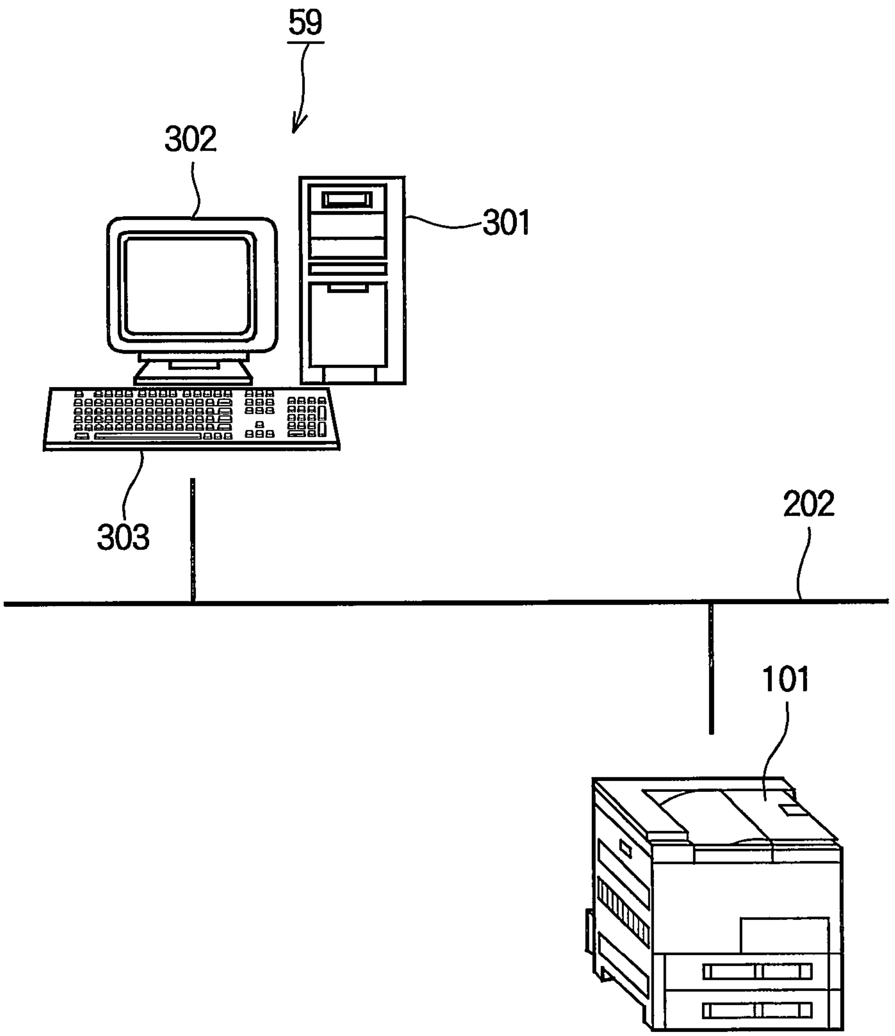
FIG. 1 illustrates an image forming system according to the invention.

Embodiments will now be described with reference to the attached drawings, in which like elements are indicated by like reference characters. The image forming apparatus in the embodiments is an electrophotographic color printer.

Referring to FIG. 1, the embodiments concern an image forming system in which the printer 101 is linked by a communication network 202 to a host computer 59. The host computer 59 includes a processing unit 301, a display unit 302, and a user input interface such as a keyboard 303.

Figure 2:
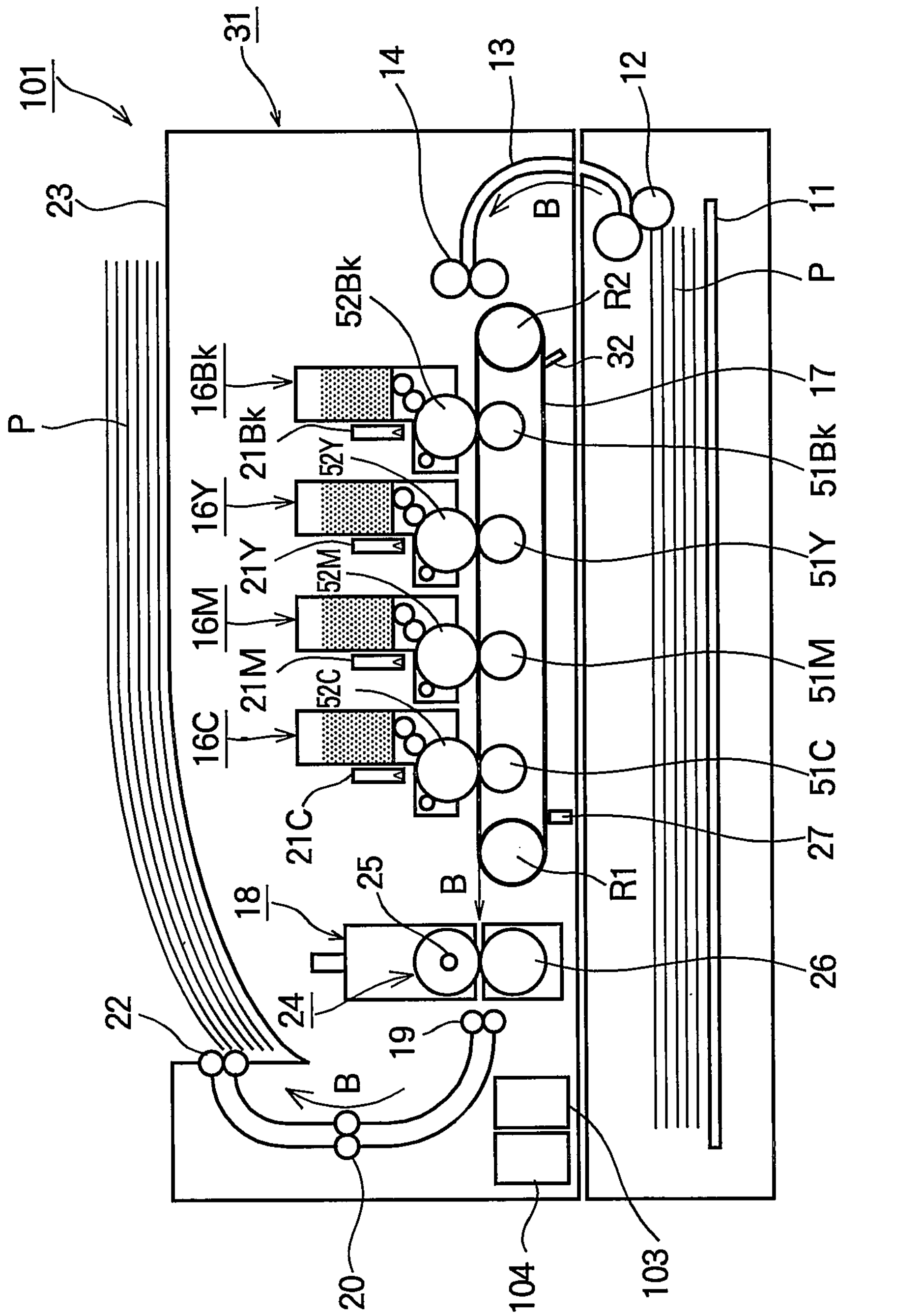
FIG. 2 is a schematic side sectional view of the printer in FIG. 1, illustrating a first embodiment of the invention.

Referring to FIG. 2, the printer 101 includes, at the bottom of its main body 31, a cassette 11 that holds image forming media such as sheets of paper P. A pickup roller 12 picks these sheets up one by one from the cassette 11 and feeds them through a media transport path 13 in the direction of arrow B to a pair of transport rollers 14. The paper then travels on a transport belt 17 that loops around a driving roller R1 and a following or idling roller R2. The transport belt 17 carries the paper between a black image forming unit 16Bk, a yellow image forming unit 16Y, a magenta image forming unit 16M, and a cyan image forming unit 16C and four corresponding transfer rollers 51Bk, 51Y, 51M, and 51C. The transport belt 17, driving roller R1, idling roller R2, and transfer rollers 51Bk, 51Y, 51M, and 51C constitute a transfer unit.

The image forming units may be disposed in the sequence 16Y, 16M, 16C, 16Bk instead of the sequence 16Bk, 16Y, 16M, 16C.

The image forming units 16Bk, 16Y, 16M, 16C include respective photosensitive drums 52Bk, 52Y, 52M, 52C that functions as image carriers by carrying electrostatic images that are developed to form black, yellow, magenta, and cyan toner images. The toner images are transferred successively to the paper P by the transfer rollers 51Bk, 51Y, 51M, 51C to build up a full-color image.

The paper next enters a fuser 18 comprising a fusing roller 24 with a heating element 25 and a pressure roller 26, which fuse the toner image onto the paper by a combination of heat and pressure. Two pairs of transport rollers 19, 20 and a pair of delivery rollers 22 then eject the paper onto the top cover 23 of the printer.

The image forming units 16Bk, 16Y, 16M, 16C also include respective optical heads 21Bk, 21Y, 21M, 21C that face the photosensitive drums 52Bk, 52Y, 52M, 52C. Each optical head includes an array of light-emitting elements that are selectively driven according to image data, and a rod lens array that focuses the emitted light onto the surface of the photosensitive drum. In the embodiments described herein, the light-emitting elements are light-emitting diodes (LEDs) and the optical heads will be referred to as LED heads.

The image forming units 16Bk, 16Y, 16M, 16C are removably mounted in the main body 31 of the printer and can be removed by opening the top cover 23. The LED heads 21Bk, 21Y, 21M, 21C may be separately attached to the top cover 23.

A density detector or density sensor 27 is mounted below the transport belt 17 near the driving roller R1 to measure the density of a density adjustment image. The density adjustment image is a toner image that is formed on the transport belt 17 instead of on paper P. A cleaning blade 32 is provided below the transport belt 17 near the idling roller R2 to remove the toner from the transport belt 17 after the density of the density adjustment image has been detected. The toner removed by the cleaning blade 32 is collected for disposal.

The printer 101 also includes two control units: a first control unit or image forming control unit 103, and a second control unit or printer control unit 104.

The image forming units 16Bk, 16Y, 16M, 16C will now be described in more detail. Since the image forming units 16Bk, 16Y, 16M, 16C all have the same structure, the black image forming unit 16Bk will be described as an example and descriptions of the other image forming units 16Y, 16M, 16C will be omitted.

Figure 3:
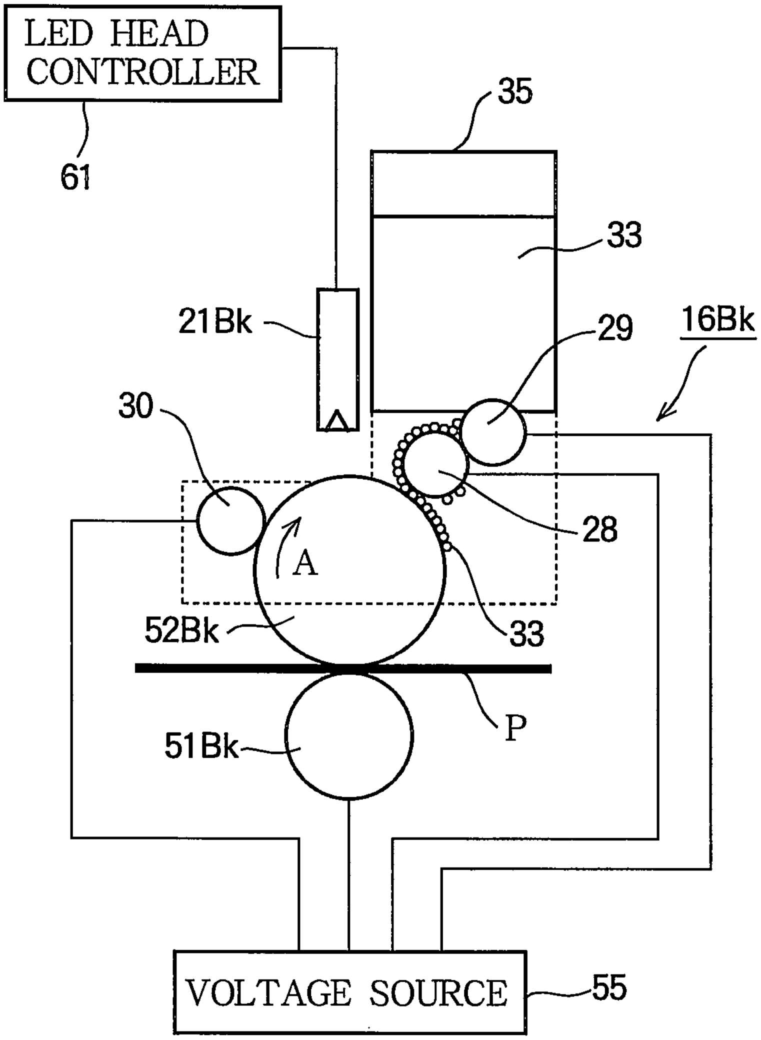
FIG. 3 is a schematic sectional view of one of the image forming units and its peripheral components in FIG. 2.

Referring to FIG. 3, the black image forming unit 16Bk comprises the black photosensitive drum 52Bk, a charging roller 30 that imparts a uniform electrostatic charge to the surface of the photosensitive drum 52Bk, a developer roller 28 that carries toner 33 onto the photosensitive drum 52Bk, a toner supply roller 29 that supplies the toner 33 to the developer roller 28, and a toner cartridge 35 that holds a supply of toner 33. The developer roller 28 and toner supply roller 29 constitute a developer unit.

The photosensitive drum 52Bk has a conductive base layer of aluminum, for example, and a surface layer of, for example, an organic photosensitive substance. The charging roller has, for example, a conductive metal shaft on which a rubber semiconductor material such as epichlorohydrin is formed in a roller shape. The developer roller 28 has a conductive metal shaft covered with foam rubber, formed by adding a foaming agent when the rubber is kneaded.

The developer roller 28 and charging roller 30 are placed so as to make contact with the photosensitive drum 52Bk. The developer roller 28, supply roller 29, charging roller 30, and transfer roller 51Bk are connected to a voltage source 55 that applies respective bias voltages. The photosensitive drum 52Bk, the above rollers 28, 29, 30, 51Bk, and the other rollers shown in FIG. 1 are driven by motors that are omitted from the drawings so as not to obscure the invention with needless detail.

The LED head 21Bk faces the photosensitive drum 52Bk at a point between the charging roller 30 and the developer roller 28. During printing, the photosensitive drum 52Bk turns clockwise, in the direction of arrow A, so that an area on the surface of the photosensitive drum 52Bk is first charged by the charging roller, then selectively illuminated by the LED head 21Bk, and then brought to the developer roller 28.

The developer roller 28 and toner supply roller 29 both turn counterclockwise. The rotation of the toner supply roller 29 brings toner 33 to the developer roller 28. The rotation of the developer roller 28 carries the toner 33 past a developer blade (not shown) that removes excess toner, leaving a thin uniform layer of toner on the developer roller 28.

When the developer roller 28 meets the photosensitive drum 52Bk, this thin layer of toner 33 adheres to the illuminated parts of the photosensitive drum 52Bk, which have lost their charge, but is repelled from the non-illuminated parts, which retain their charge. A toner image replicating the illumination pattern is thereby formed on the photosensitive drum 52Bk. The toner is attracted from the photosensitive drum 52Bk to the paper P by the bias voltage supplied by the voltage source 55 to the transfer roller 51Bk.

Next, the control units 103, 104 in a first embodiment will be described with reference to the block diagram in FIG. 4.

Figure 4:
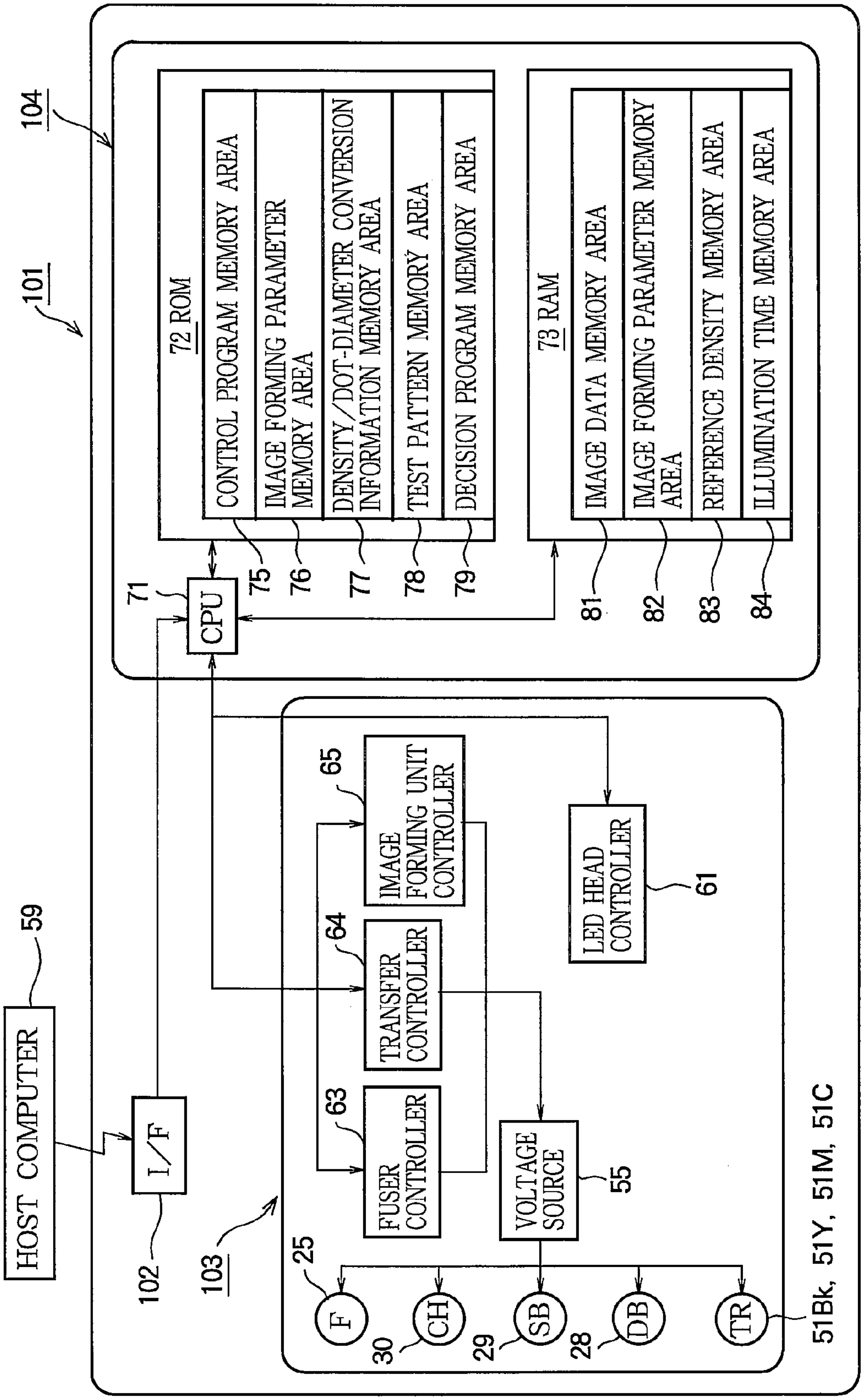
FIG. 4 is a block diagram of the control units of the printer in the first embodiment.

As shown in FIG. 4, the image forming control unit 103 and printer control unit 104 are connected to the host computer 59 by a communication interface (I/F) 102. This interface 102 functions as the input unit of the printer 101, receiving commands, image data, and other information from the host computer 59.

The image forming control unit 103 includes the voltage source 55 shown in FIG. 3, which supplies voltages to the heating element 25 in the fuser roller, the developer rollers 28, toner supply rollers 29, and charging rollers 30 in the image forming units, and to transfer rollers 51Bk, 51Y, 51M, 51C. The image forming control unit 103 also includes an LED head controller 61 that controls the LED heads, a fuser controller 63 that controls the fuser 18, a transfer controller 64 that controls the transfer units, and an image forming unit controller 65 that controls the image forming units 16Bk, 16Y, 16M, 16C.

The printer controller 104 includes a computing device such as a microprocessor, referred to below as the printer's central processing unit (CPU) 71, a read-only memory (ROM) 72, and a random access memory 73. The ROM 72 includes a control program memory area 75, an image forming parameter memory area 76, a density/dot-diameter conversion information memory area 77, a test pattern memory area 78, and a decision program memory area 79. The RAM 73 includes an image data memory area 81, an image forming parameter memory area 82, a reference density memory area 83, and an illumination time memory area 84.

Figure 5:
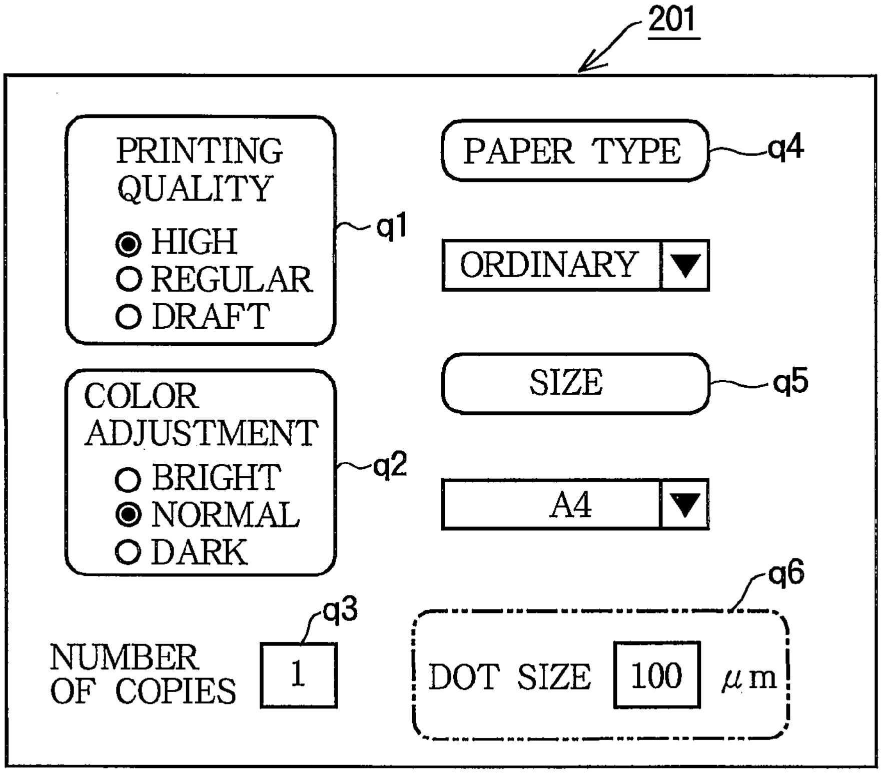
FIG. 5 illustrates a printing control selection screen displayed in the first embodiment.

When the printer is activated to form (print) an image, a printing control program running on the processing unit 301 in the host computer 59 displays the printing control selection screen 201 shown in FIG. 5 on the display unit 302. The printing control selection screen 201 includes a printing quality selection field q1 for making a selection that determines the printing resolution, a color adjustment field q2 for selecting the brightness of the printed image, number of copies field q3 for selecting the number of printed copies, a paper selection field q4 for selecting the type of paper, a paper size selection field q5 for selecting the paper size, and a dot size field q6 for specifying dot information, more specifically for specifying the desired dot diameter.

The operator uses the keyboard 303 or another input device to select the quality and brightness of the printed image, the number of copies to print, the type of paper P, the paper size and thickness, and enter other printing control information. If the-operator wishes to specify the exact diameter of the dots making up the printed image, the operator can enter the desired diameter in the window shown in the dot size field q6. The information entered by the operator can be classified as printing settings such as the printing quality, image brightness, and number of copies, media information such as the type of paper and its size and thickness, and dot information, more specifically, the dot diameter.

A printing control processor (not shown) in the processing unit 301 controls the printing process on the basis of the entered information. Operating according to a printing control program, it creates image data and sends the image data to the printer 101 together with the printing settings, media information, and dot information. In the printer 101, an image forming processor, which is not explicitly shown in the drawings but includes the CPU 71 and part of the control program stored in the control program memory area 75, receives the image data, printing settings, media information, and dot information as printer control information, reads necessary information from the ROM 72 and RAM 73, and forms an image according to the printer control information.

An image forming condition setting processor in the image forming processor sets image forming conditions, stores the image data in the RAM 73, reads image forming parameters (printing parameters) from the image forming parameter memory area 76 in the ROM 72 according to the printing settings and media information, and stores the image forming parameters temporarily in the image forming parameter memory area 82 in the RAM 73.

The image forming parameters stored in the image forming parameter memory area 76 include the fusing temperature of the fuser 18 during the printing process, a drum voltage indicating the voltage to be applied to the charging roller 30, a developer bias voltage indicating the voltage to be applied to the developer roller 28, a supply bias voltage indicating the voltage to be applied to the toner supply roller 29, a transfer voltage indicating the voltage to be applied to the transfer rollers 51Bk, 51Y, 51M, 51C, and other information. The image forming condition setting processor selects a unique set of image forming parameters that correspond to the printing settings and media information and reads the selected parameters.

The density/dot-diameter conversion information memory area 77 in the ROM 72 stores information relating dot diameter to image density, and image density to a parameter that will be used to adjust the image density and dot diameter. In the first embodiment this parameter is the illumination time or exposure output time per dot in the LED heads 21Bk, 21Y, 21M, 21C, indicating that time for which an LED is to be driven to form one dot.

When the image data have been stored in the image data memory area 81 and the image forming parameters have been stored in the image forming parameter memory area 82, an operation control processor (control processor) in the image forming processor carries out an operation control process and starts printing operations by executing an operation control program stored in the control program memory area 75.

Specifically, the operation control processor sends commands to the image forming unit controller 65, the transfer controller 64, the fuser controller 63, a paper supply and transport controller (not shown), a roller driving controller (not shown), and other components not shown in the drawings. The image forming unit controller 65, transfer controller 64, and fuser controller 63 send signals to the voltage source 55, which applies a drum charging voltage to the charging rollers 30 and thus to the photosensitive drums 52Bk, 52Y, 52M, 52C, a developer bias to the developer rollers 28, a supply bias to the toner supply rollers 29, and a transfer voltage to the transfer rollers 51Bk, 51Y, 51M, 51C to print toner images on the paper P.

Even given identical parameter values and other printing conditions, the surface potentials of the photosensitive drums 52Bk, 52Y, 52M, 52C and the toner 33 (FIG. 4) may vary due to aging changes in the photosensitive drums 52Bk, 52Y, 52M, 52C and toner, and to environmental changes, so the amount of toner in the toner layer may vary. If the amount of toner decreases, for example, then to maintain the same image density, it is necessary to lengthen the illumination time in the LED heads 21Bk, 21Y, 21M, 21C.

Figure 6:
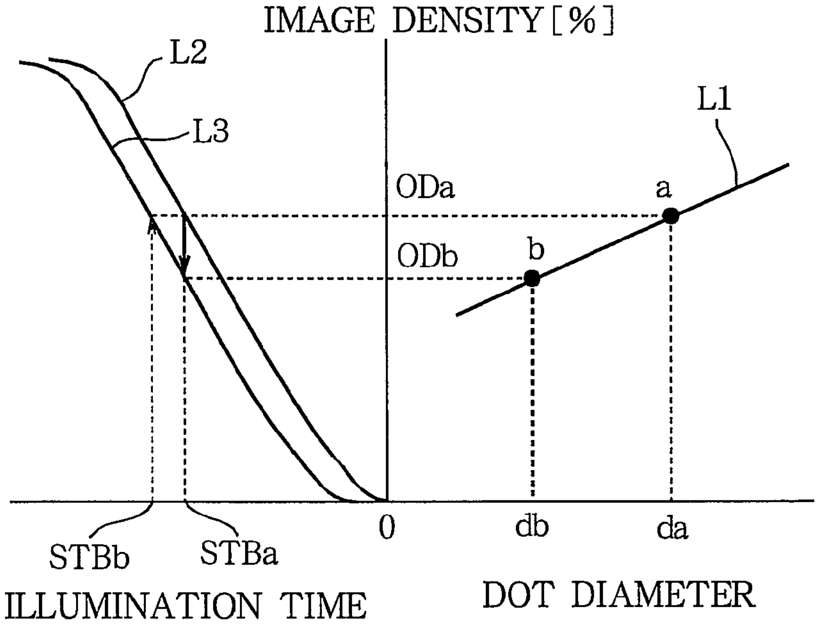
FIG. 6 is a graph illustrating the relation between dot diameter and image density in the first embodiment.

These variations are illustrated in FIG. 6. The left half of the horizontal axis indicates illumination time in the LED heads 21Bk, 21Y, 21M, 21C; the right half of the horizontal axis indicates dot diameter. The vertical axis indicates image density.

Line L1 is a line accurately representing the relation between dot diameter and image density, derived as explained later. Curve L2 indicates the relation between illumination time and image density under standard environmental conditions when there have been no aging changes in the LED heads 21Bk, 21Y, 21M, 21C and toner 33. Curve L3 indicates a hypothetically shifted relation between illumination time and image density due to aging changes in the LED heads 21Bk, 21Y, 21M, 21C and toner 33, or to changed environmental conditions.

When the operator designates a dot diameter da in the dot size field q6 in FIG. 5, the image forming processor calculates the corresponding image density ODa of the density adjustment image by referring to the information in the density/dot-diameter conversion information memory area 77, then obtains the corresponding illumination time STBa in the LED heads 21Bk, 21Y, 21M, 21C from curve L2, again by referring to the information in the density/dot-diameter conversion information memory area 77, and sets STBa as the illumination time to be used during printing. If there have been no aging changes in the LED heads 21Bk, 21Y, 21M, 21C and no environmental or other changes, the image density measured by the density sensor 27 will be close to ODa.

If there have been aging changes in the LED heads 21Bk, 21Y, 21M, 21C, or if there have been environmental or other changes, however, then the image density measured by the density sensor 27 may be a value ODb lower than ODa, because the relation between LED illumination time and image density has shifted from curve L2 to curve L3.

The printer itself has no way of knowing that the relation has shifted from curve L2 to curve L3, so it will use the LED illumination time STBa obtained from curve L2, resulting in an image density of ODb, and will operate at point b instead of point a on line L1, printing dots with a diameter of db much smaller than the specified diameter da. Printed image quality will be greatly degraded.

For that reason, when a dot diameter is specified in the dot size field q6, a density adjustment processor (not explicitly indicated in the drawings) including the CPU 71 and another part of the control program stored in the control program memory area 75 executes a density adjustment process and adjusts a parameter that controls the image density and dot diameter.

A particular one of the image forming units 16Bk, 16Y, 16M, 16C is used for this adjustment. In the present embodiment, the black image forming unit 16Bk is used. The adjustment is based on a formula, prestored in the density/dot-diameter conversion information memory area 77, giving the relation between dot diameter and image density. Alternatively, instead of a formula, a table giving the relation between dot diameter and image density may be prestored in the density/dot-diameter conversion information memory area 77.

The density adjustment processor begins by calculating a reference density. When a dot density d1 is entered by the operator, the density adjustment processor reads the dot diameter d1, refers to the density/dot-diameter conversion information memory area 77 to obtain the reference density OD1 corresponding to dot diameter d1, and stores the OD1 value in the reference density memory area 83 in the RAM 73.

Next, an exposure output processor functioning as a adjustment calculator in the density adjustment processor performs an exposure output calculation process, which is an instance of a parameter adjustment calculation process. The exposure output processor reads the dot diameter d1, refers to the density/dot-diameter conversion information memory area 77 to obtain (calculate) a corresponding reference illumination time for LED head 21Bk, and stores this time in the illumination time memory area 84 in the RAM 73. The reference illumination time is an instance of a reference parameter value.

Next, a density adjustment image forming processor in the density adjustment processor executes a density adjustment image forming process in which it uses the black image forming unit 16Bk to form an image of a test pattern stored in the test pattern memory area 78 as a density adjustment image on the transport belt 17. The density adjustment image is accordingly formed using black toner.

First, the density adjustment image forming processor instructs the image forming unit controller 65 and LED head controller 61 to form a toner image of the test pattern on photosensitive drum 52Bk. In response to these instructions the image forming unit controller 65 uses the charging roller 30 (FIG. 3) to charge the surface of photosensitive drum 52Bk, and the LED head controller 61 reads the image data of the test pattern from the test pattern memory area 78 and drives LED head 21Bk according to the image data, turning the LEDs on for the illumination time STB to form the dots of the test pattern. Exposure to light emitted by the LEDs forms an electrostatic latent image on the surface of photosensitive drum 52Bk.

Next, the image forming unit controller 65 develops the latent image by applying toner 33 to form a toner image of the test pattern. In this process, the toner supply roller 29 adjacent the bottom of the toner cartridge 35 is charged by a negative bias voltage applied by the voltage source 55, so that the toner 33 becomes negatively charged as it is supplied to the developer roller 28. The toner supplied to the developer roller 28 is further charged by the developer roller 28 itself. A uniform toner layer is formed on the developer roller 28, and toner is transferred to the surface of photosensitive drum 52Bk to form a black toner image.

Next, the density adjustment image forming processor instructs the transfer controller 64 to transfer the toner image from the surface of the photosensitive drum 52Bk to the transport belt 17. The transfer controller 64 commands the voltage source 55 to apply a positive transfer voltage to transfer roller 51Bk. The toner image is transferred to the transport belt 17 by electrostatic attraction at the points between photosensitive drum 52Bk and transfer roller 51Bk. A toner image of the test pattern is thereby formed on the surface of the transport belt 17 as a density adjustment image.

The motion of the transport belt 17 then brings the density adjustment image opposite the density sensor 27, which detects the image density of the density adjustment image and sends sensor output to the CPU 71.

A density comparison processor in the density adjustment processor, which also includes a density comparison program stored in the decision program memory area 79, compares the image density detected by the density sensor 27 with the reference density OD1 stored in the reference density memory area 83. The decision program memory area 79 first converts the sensor output received from the density sensor 27 to a detected image density OD2, then reads the reference density OD1 from the reference density memory area 83 and compares OD2 with OD1.

Next, an exposure output adjustment processor in the density adjustment processor, functioning as a parameter adjustment processor, performs a parameter adjustment process, more specifically, an exposure output adjustment process, by adjusting the illumination time STB according to the result of the comparison made by the density comparison processor.

If OD2 is less than OD1, indicating that the density adjustment image has a lower density than the reference density corresponding to the input dot diameter d1, the exposure output adjustment processor adds an increment Δt to the illumination time STB, thereby lengthening the illumination time. As is well known, longer illumination times produce denser images; the dot diameter d1 is increased by an amount corresponding to the increment Δt added to the illumination time STB. The value of Δt should be considerably smaller than the difference δT between the illumination times STBa and STBb shown in FIG. 6.

If OD2 is greater than OD1, indicating that the density adjustment image has a higher image density than the reference image density corresponding to the input dot diameter d1, the exposure output adjustment processor subtracts the value Δt from the illumination time STB, thereby shortening the illumination time and reducing the dot diameter d1.

The density adjustment image forming processor sends any alteration in the illumination time STB to the image forming unit controller 65, then instructs the image forming unit controller 65 and LED head controller 61 to form another density adjustment image on photosensitive drum 52Bk. The image forming unit controller 65 again uses the charging roller 30 to charge the surface of photosensitive drum 52Bk, and the LED head controller 61 again drives LED head 21Bk according to the test pattern image data, causing the LEDs to illuminate the photosensitive drum 52Bk with the altered illumination time STB, thereby forming another latent image of the test pattern on the surface of photosensitive drum 52Bk.

This latent image is developed to form a toner image, which is transferred to the transport belt 17 as a new density adjustment image. When motion of the transport belt 17 brings this new density adjustment image opposite the density sensor 27, the density OD2 of the new density adjustment image is detected and compared with the reference density OD1 as described above. If the new value of OD2 is still not equal to the reference density OD1, a new adjustment is made.

This process is repeated, the illumination time STB being adjusted each time the detected image density OD2 fails to match the reference density OD1, and a new density adjustment image being formed with the altered illumination time STB.

When the detected density OD2 becomes equal to the reference density OD1, the density adjustment processor sets the current value of the illumination time STB in the illumination time memory area 84 and the density adjustment process ends.

After the density adjustment process has ended, the image forming processor conducts normal printing on the paper P, using the value of the illumination time STB set in the illumination time memory area 84.

Although the black image forming unit 16Bk is used to form the density adjustment image in this embodiment, one of the other image forming units 16Y, 16M, 16C may be used instead. The density/dot-diameter conversion information memory area 77 should then store information relating dot diameter to the image density of the density adjustment image for the color of toner 33 used.

Although the image density is adjusted by adjusting the illumination time STB in the present embodiment, that is, by adjusting the exposure process that forms the latent image, the image density may be adjusted by making an adjustment related to any other part of the image forming process, such as the drum charging process, the toner charging process, the development process, or the transfer process. For example, a predetermined increment may be added to or subtracted from the drum charging voltage applied to the charging roller 30, the supply bias voltage applied to the toner supply roller 29, the developing bias applied to the developer roller 28, or the transfer voltage applied to the transfer roller 51Bk, or the image density may be adjusted by a combination of these adjustments.

To adjust the image density by adjusting the developing process, for example, when the detected image density OD2 is less than the reference image density OD1, indicating that the image density is lower than the reference density corresponding to the input dot diameter d1, the parameter adjustment processor may perform a voltage adjustment process that increases the absolute value of the developing bias voltage applied to the developer roller 28 by a predetermined amount Δv. Similarly, if the detected density OD2 is greater than the reference density OD1, the parameter adjustment processor may reduce the absolute value of the developing bias voltage applied to the developer roller 28 by the predetermined amount Δv. Repetition of these adjustments can bring the detected density OD2 into agreement with the reference density OD1.

If a combination of, for example, adjustments to the exposure process and the toner charging process is used, then the adjusted quantities are the illumination time STB and the supply bias voltage.

Any of these adjustment processes enables the image density to be accurately adjusted by just detecting the image density of the density adjustment pattern, without the need for a high-resolution scanner inside or outside the main body 31 of the printer 101 to measure the dot diameter accurately, so the work of adjusting the image density is greatly simplified.

Since the density adjustment process is performed just before the printing process, the desired image density is obtained regardless of environmental changes, aging changes such as an increased cumulative number of pages printed, or other changes affecting the printer 101. A high level of dot reproducibility can thereby be maintained.

Figure 7:
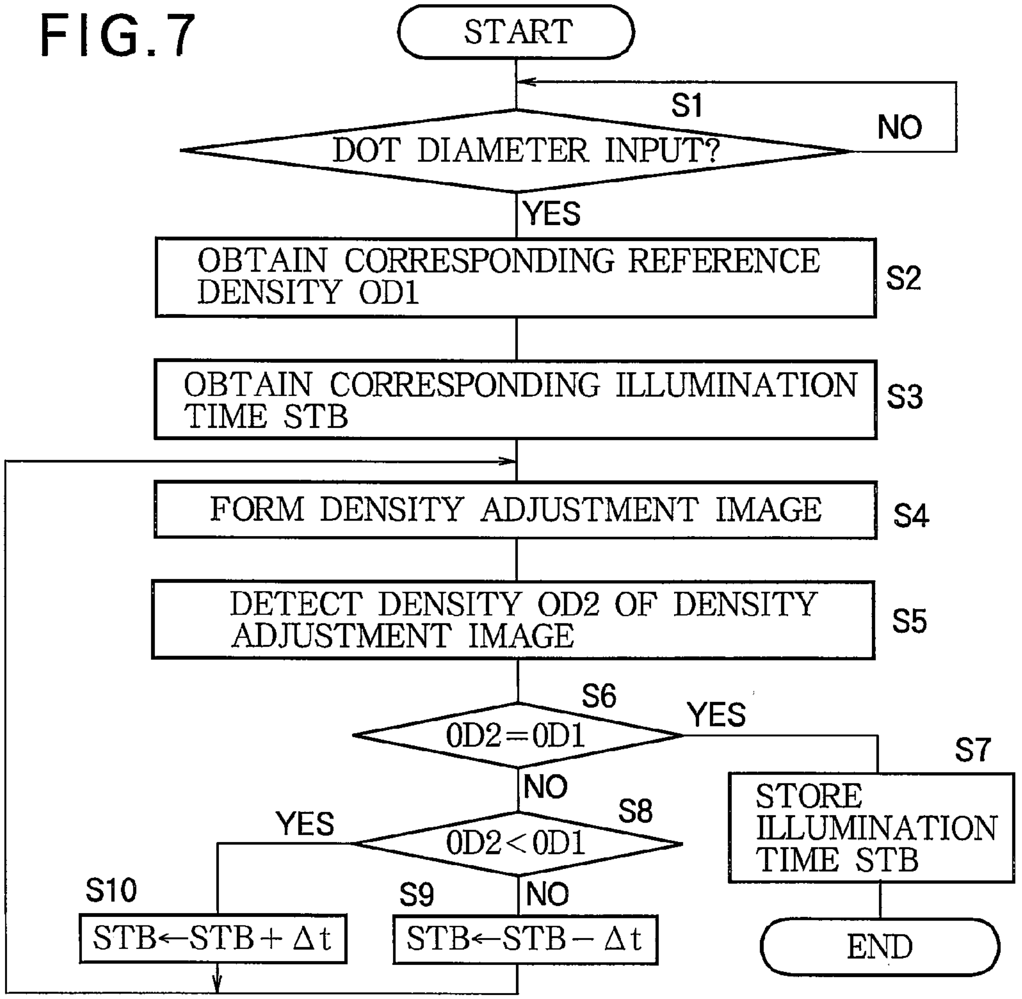
FIG. 7 is a flowchart illustrating the dot diameter and adjustment process in the first embodiment.
Figure 8:
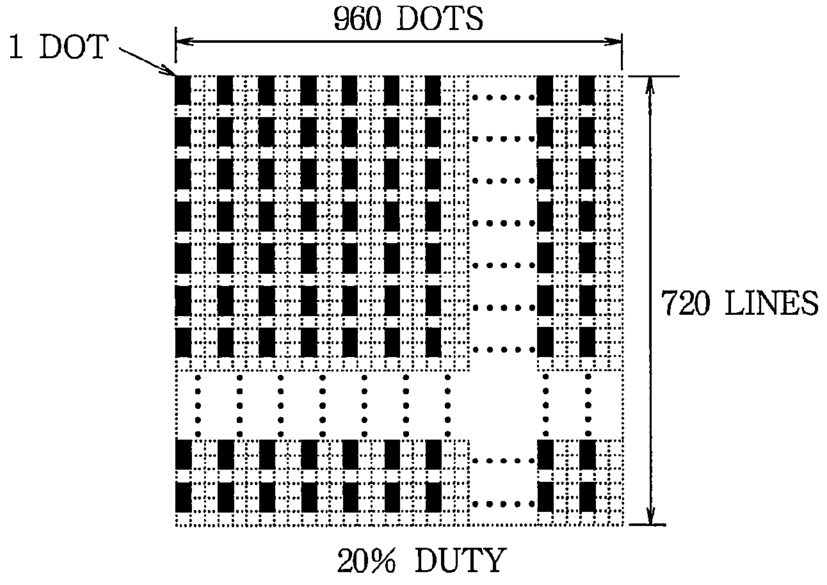
FIGS. 8, 9, 10, 11, 12, and 13 illustrate test patterns used in the first embodiment.
Figure 9:
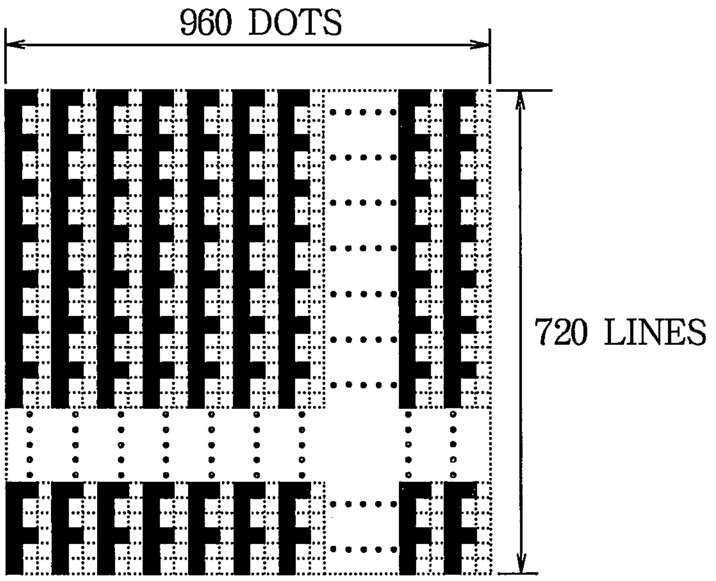
Figure 10:
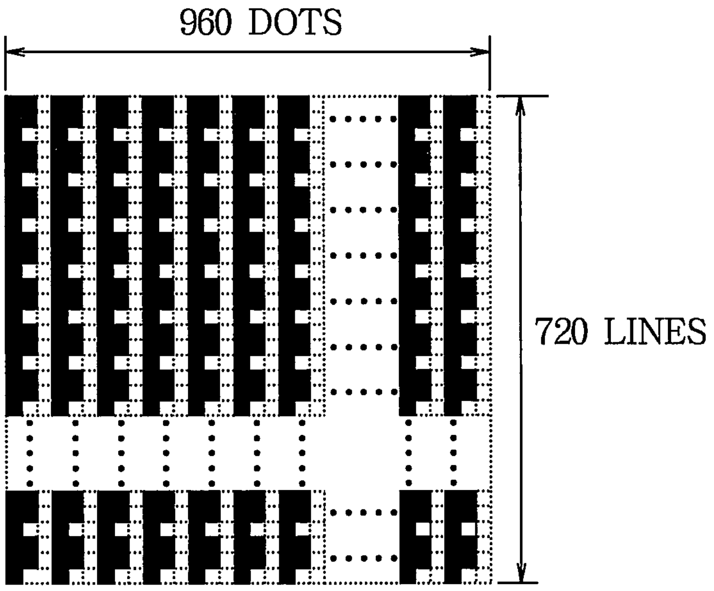
Figure 11:
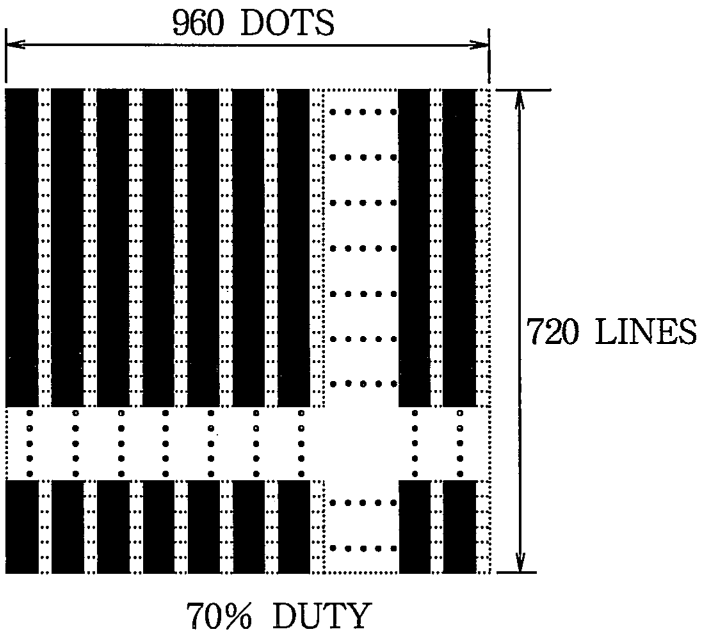
Figure 12:
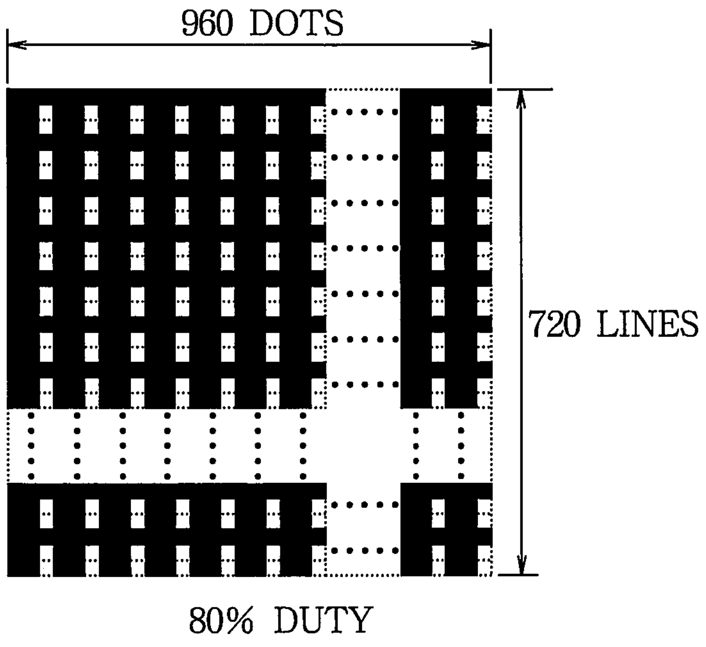
Figure 13:
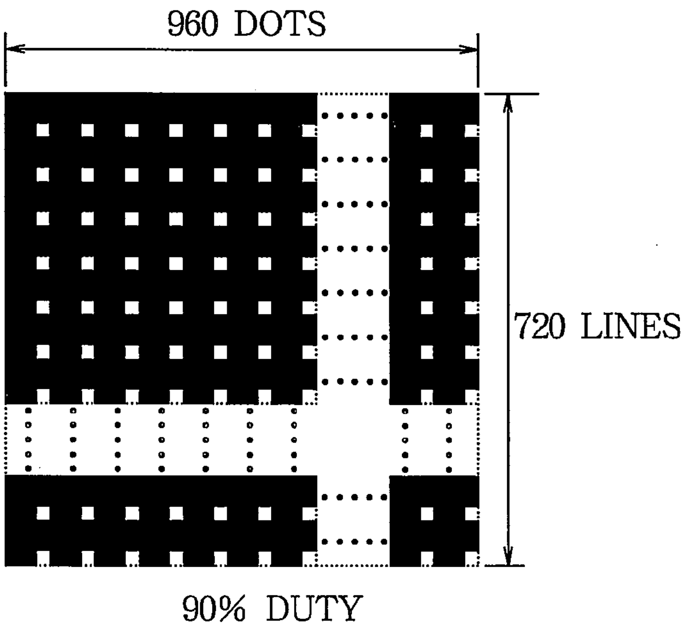

The adjustment process is summarized in the flowchart in FIG. 7.

In step S1, the density adjustment processor waits for input of a dot diameter d1. When a dot diameter d1 is entered, the density adjustment processor proceeds to step S2.

In step S2, the reference density OD1 corresponding to the input dot diameter d1 is obtained from the density/dot-diameter conversion information memory area 77.

In step S3, the illumination time STB corresponding to the reference density, thus to the input dot diameter d1, is obtained from the density/dot-diameter conversion information memory area 77.

In step S4, a density adjustment image is formed.

In step S5, the density OD2 of the density adjustment image is detected.

In step S6, the equality of the detected density OD2 to the reference density OD1 is tested. If OD2 and OD1 are equal, the process proceeds to step S7; otherwise, it proceeds to step S8.

In step S7, the current illumination time STB is stored and the adjustment process ends.

In step S8, whether the detected density OD2 is less than the reference density OD1 is tested. If OD2 is less than OD1, the process proceeds to step S10. If OD2 is not less than OD1, then OD2 must be greater than OD1 and the process proceeds to step S9.

In step S9, the illumination time STB is reduced by Δt and the process returns to step S4.

In step S10, the illumination time STB is increased by Δt and the process returns to step S4.

Next, a method of deriving the formula stored in the density/dot-diameter conversion information memory area 77 will be described.

FIGS. 8 to 13 show six patterns that may be used to derive this formula. In round numbers, the ratio of printed dots to the total number of dot positions (the duty ratio or duty cycle) is 20% in FIG. 8, 40% in FIG. 9, 60% in FIG. 10, 70% in FIG. 11, 80% in FIG. 12, and 90% in FIG. 13. Each pattern is a matrix of 720 lines of 960 dots each.

The invention is not limited to six patterns. If necessary, a larger number of patterns may be used to provide more duty values.

A dot diameter is entered on the printing control selection screen 201 (FIG. 5), and images of the six patterns are printed on a single sheet of paper P (a single image carrier). An optical density meter such as the X-Rite 528 spectrodensitometer manufactured by X-Rite Ltd. of Cheshire, U.K. and an instrument such as the Techkon DMS 910 IR digital microscope manufactured by Techkon GmbH of Koenigstein, Germany are used to measure the image density and dot diameter of each printed pattern. The density meter should have a higher accuracy than the density sensor 27 (for example, expressed in terms of optical density (OD), a repetition accuracy of ±0.005 OD), and the dot diameter measuring instrument should have an accuracy of ±1 μm or better. The density sensor 27 in the first embodiment has an accuracy of ±0.1 OD. These measurements give six data points as indicated by the symbols in the left column in FIG. 14.

Figure 14:
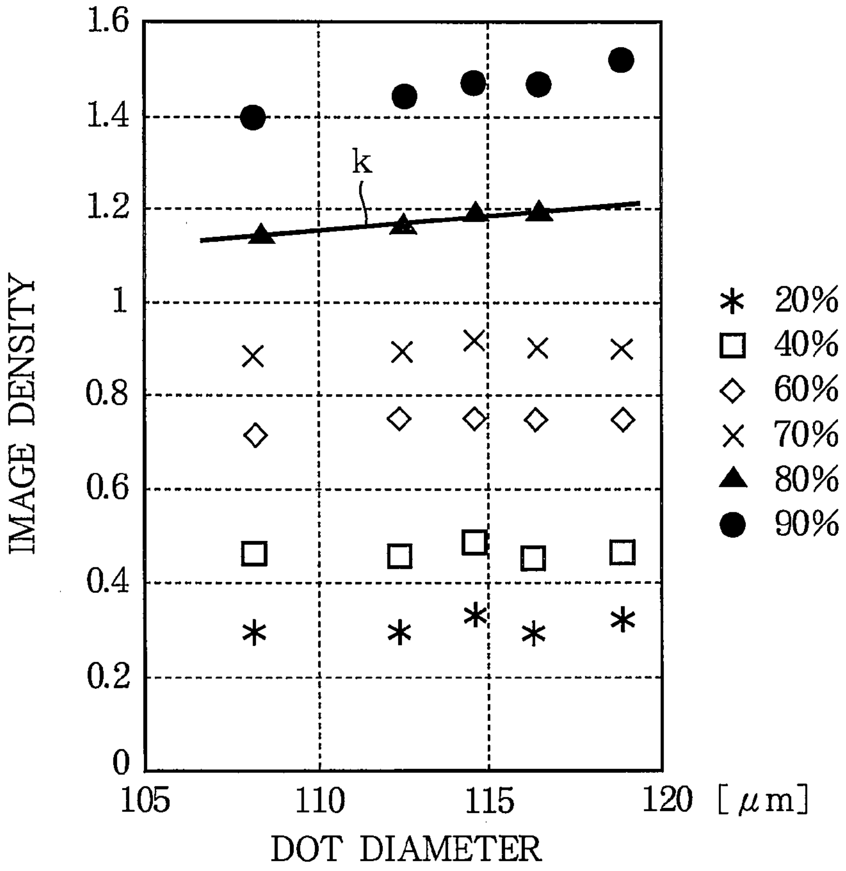
FIG. 14 illustrates correlations between dot diameter and image density for the test patterns in FIGS. 8 to 13.

The above process is then repeated with other specified dot diameters, obtaining other sets of data points as shown in FIG. 14.

A correlation coefficient is then calculated for each duty ratio, and a regression line is plotted by the least squares method for the data of the duty ratio having the highest correlation coefficient. In FIG. 14, a regression line k is plotted for the 80% duty ratio, the data for which have the highest correlation coefficient. The regression line k is then reduced to a mathematical formula relating dot diameter to image density, and this formula is stored in the density/dot-diameter conversion information memory area 77 (FIG. 4).

As shown in FIG. 14, for medium and low duty values (e.g., 20% to 70%), the image density varies only slightly with the dot diameter. The reason is that the effect of the density of the paper P dilutes the effect of the density of the toner image, making it difficult to measure the density of the printed pattern accurately. It is also difficult to measure the image density accurately at very high duty values (e.g., 90%), because the printed dots are too crowded.

In FIG. 14, the 80% pattern expresses the relation between variations in dot diameter and variations in image density most accurately. A test pattern with an 80% duty value is accordingly stored in the test pattern memory area 78. For this test pattern, the relation between dot diameter and image density may be given by the following equation (1), in which OD indicates optical density or image density, and d is the dot diameter expressed in micrometers.

$$OD=6.60^{-3}\times d+0.430 \quad (1)$$

Although the density adjustment process in the first embodiment is carried out whenever a dot diameter is specified by the operator, in a variation of the first embodiment the density adjustment process is carried out at regular intervals measured in terms of number of pages printed, number of rotations of the black photosensitive drum 52Bk, number of times toner 33 has been supplied from the toner cartridge 35, or some other suitable quantity. The intervals should be short enough that the amount of toner adhering to the black photosensitive drum 52Bk does not change significantly from one adjustment to the next. An electrically erasable programmable read-only memory or flash memory may be provided to store the adjusted parameters between adjustments.

Figure 15:
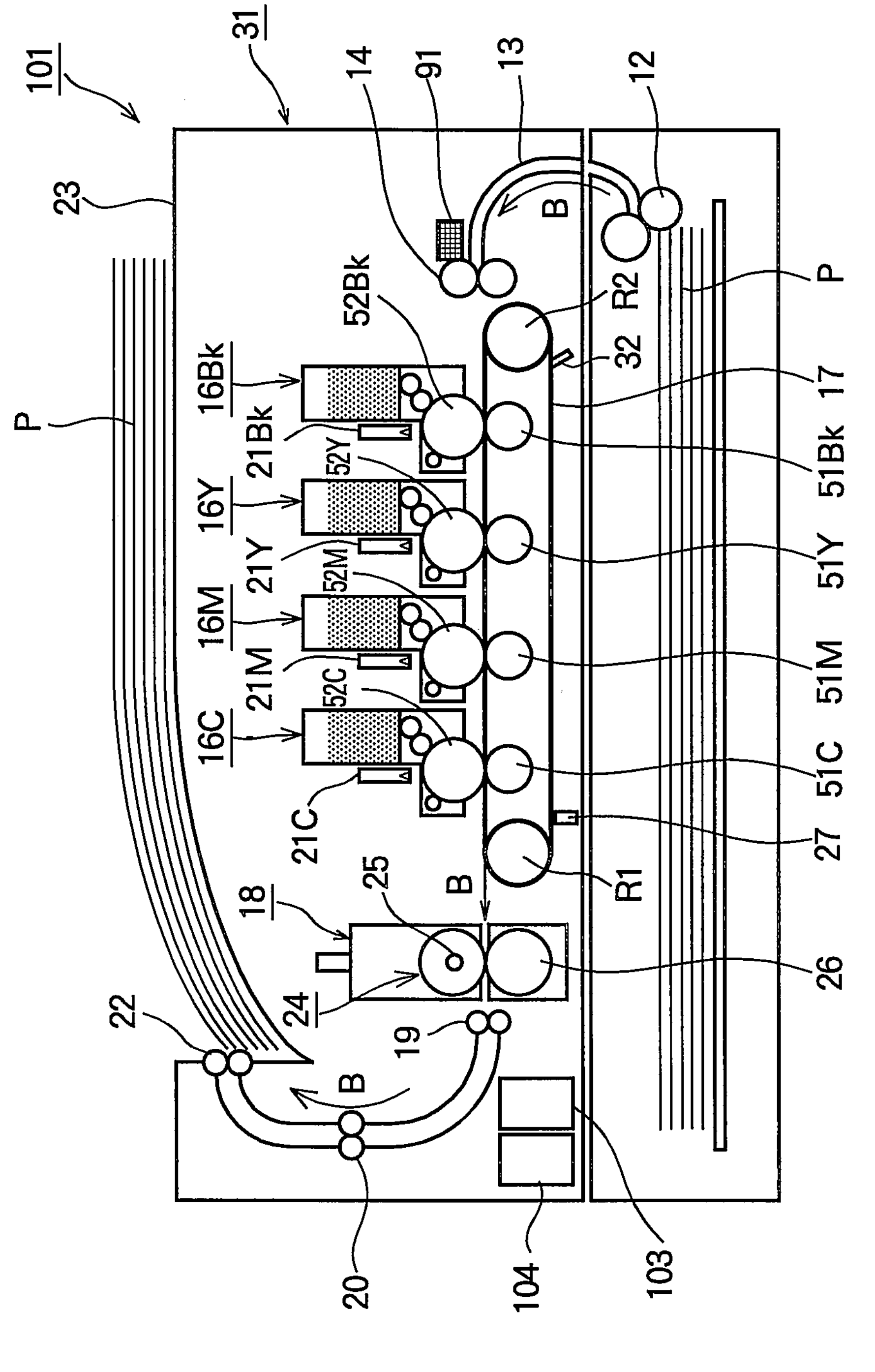
FIG. 15 is a schematic side sectional view of a printer illustrating a second embodiment of the invention.

Next, a second embodiment will be described. The second embodiment addresses the problem that, even with the same dot diameter, image density may vary depending on the surface roughness of the paper. Referring to FIG. 15, the second embodiment is a printer 101 with the same physical structure as in the first embodiment except for the addition of a gloss sensor 91.

Figure 16:
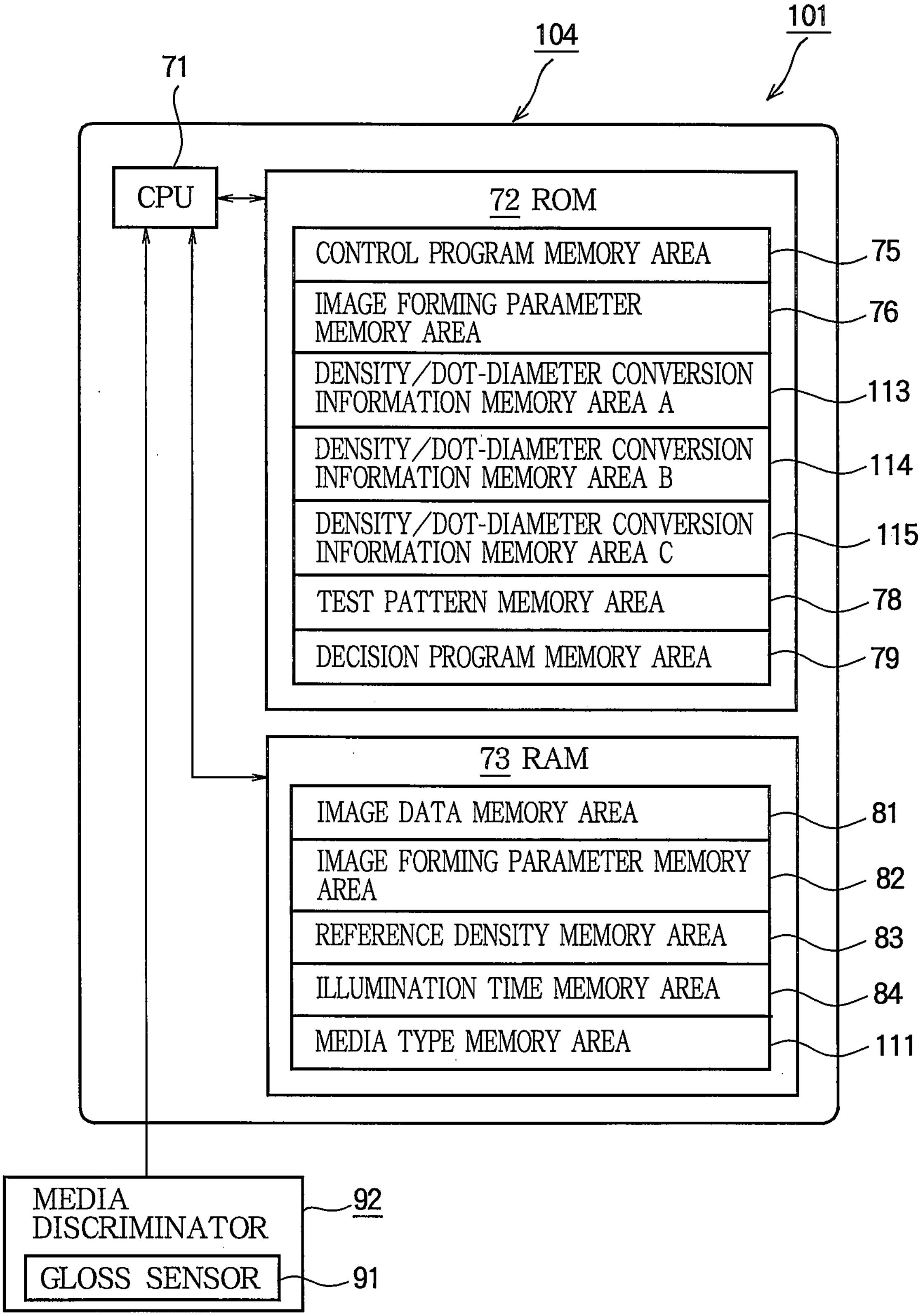
FIG. 16 is a block diagram showing parts of the control units of the printer in the second embodiment.

The gloss sensor 91 detects the gloss of the paper P just as the paper P is about to be fed through the transport rollers 14. Referring to FIG. 16, the gloss sensor 91 is part of a media discriminator 92 that determines the type of paper P from the gloss value detected by the gloss sensor 91, thus functioning as a media discrimination processor.

As also shown in FIG. 16, the RAM 73 in the second embodiment includes a media type memory area 111 for storing information designating the type of paper P. The media discriminator 92 determines the type of paper P by reading the sensor output of the gloss sensor 91 and stores type information in the media type memory area 111.

Figure 17:
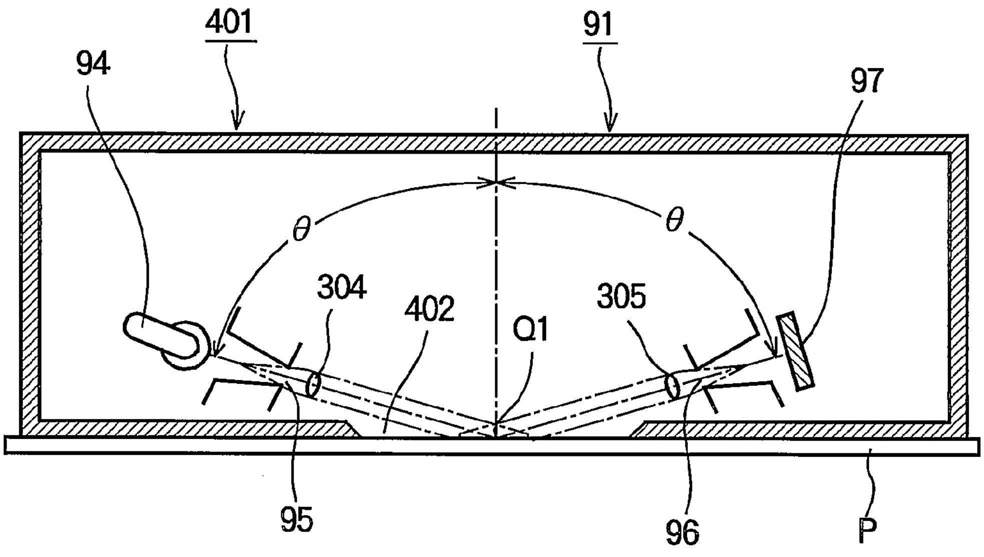
FIG. 17 is a sectional drawing illustrating the structure of the gloss sensor in the second embodiment.

Referring to FIG. 17, the gloss sensor 91 has a housing 401 with an opening 402 on the side facing the paper P. The opening 402 is centered on a point Q1 at which the gloss of the paper P is measured. A light source 94 generates light which is focused by a focusing element or lens 304 onto point Q1. Another lens 305 focuses the light reflected from point Q1 toward a photodetector 97. The light source 94 and photodetector 97 are disposed on opposite sides of the opening 402. Lens 304 is disposed between the light source 94 and the opening 402; lens 305 is disposed between the photodetector 97 and the opening 402.

A light source aperture 95 is disposed between the light source 94 and lens 304. A detection window 96 is disposed between the photodetector 97 and lens 304. Only light that passes through the light source aperture is focused onto point Q1, and only reflected light passing through the detection window 96 reaches the photodetector 97. The optical axis extending from the light source 94 through aperture 95 and lens 304 to point Q1 makes an angle θ with respect to a line normal to the paper P at point Q1. The optical axis extending from the photodetector 97 through aperture 96 and lens 305 to point Q1 makes a similar angle θ with respect to this normal line.

The smoother the surface of the paper P is, the less it scatters light, and the more light passes through lens 305 and the detection window 96, to be received by the photodetector 97. As the smoothness of the paper P decreases, surface irregularities scatter more light so that the light misses the detection window 96, and the amount of light reaching the photodetector 97 decreases. There is accordingly a fixed relationship between surface smoothness and the output of the photodetector 97.

The output of the photodetector 97 is used as the sensor output of the gloss sensor 91. The media discriminator 92 compares the sensor output with prestored threshold values to determine the type of paper P.

Figure 18A:
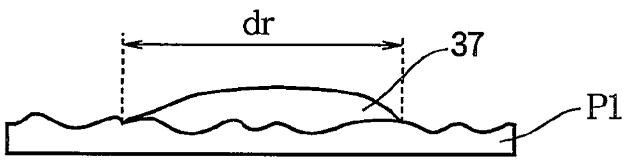
FIGS. 18A, 18B, and 18C illustrate dots formed on different types of paper.
Figure 18B:
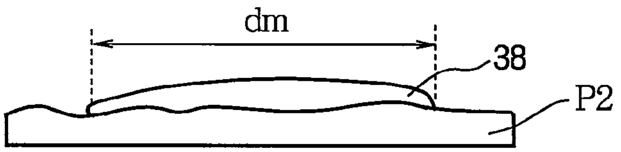
Figure 18C:
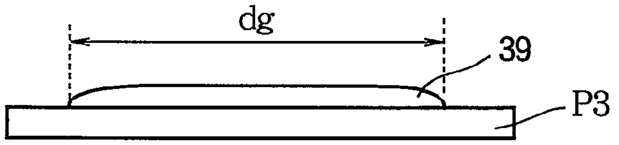

Differences in the sizes of dots formed on different types of paper are illustrated in FIG. 18A to FIG. 18C. A dot printed on a rough sheet of paper P1 as in FIG. 18A tends to have a smaller diameter dr than a dot printed on ordinary paper P2 as in FIG. 18B, and the diameter dm of a dot printed on ordinary paper P2 tends to be less than the diameter dg of a dot printed on glossy paper P3 as in FIG. 18C (dr<dm<dg).

Accordingly, it is not sufficient to adjust the image density according only to the dot diameter entered by the operator on the printing control selection screen 201 (FIG. 5) as in the first embodiment.

Referring again to FIG. 16, the ROM 72 in the second embodiment includes three density/dot-diameter conversion information memory areas 113, 114, 115. Density/dot-diameter conversion information memory area A 113 stores information relating dot diameter to image density and image density to a parameter such as illumination time for rough paper P1, under standard environmental conditions and in the absence of aging changes to the black image forming unit 16Bk and toner 33. Density/dot-diameter conversion information memory area B 114 stores similar information for ordinary paper P2. Density/dot-diameter conversion information memory area C 115 stores similar information for glossy paper P3.

When the operator enters a dot diameter, a sheet of paper P is fed as far as the gloss sensor 91, which detects its gloss, and the media discriminator 92 decides whether the paper is rough, ordinary, or glossy. A reference density calculation processor in the density adjustment processor reads both the dot diameter entered by the user and the paper type determined by the media discriminator 92, selects density/dot-diameter conversion information memory area A 113, density/dot-diameter conversion information memory area B 114, or density/dot-diameter conversion information memory area C 115 according to the paper type, uses the information in the selected density/dot-diameter conversion information memory area to derive a reference density OD1 from the specified dot diameter, and stores the reference density OD1 in the reference density memory area 83.

Alternatively, besides entering the dot diameter, the operator may enter the type of paper P in the paper type field q4 of the printing control selection screen 201 in FIG. 5, and the reference density calculation processor may select density/dot-diameter conversion information memory area A 113, density/dot-diameter conversion information memory area B 114, or density/dot-diameter conversion information memory area C 115 according to the paper type specified by the operator.

The three density/dot-diameter conversion information memory areas 113, 114, 115 will now be described in more detail.

Figure 19:
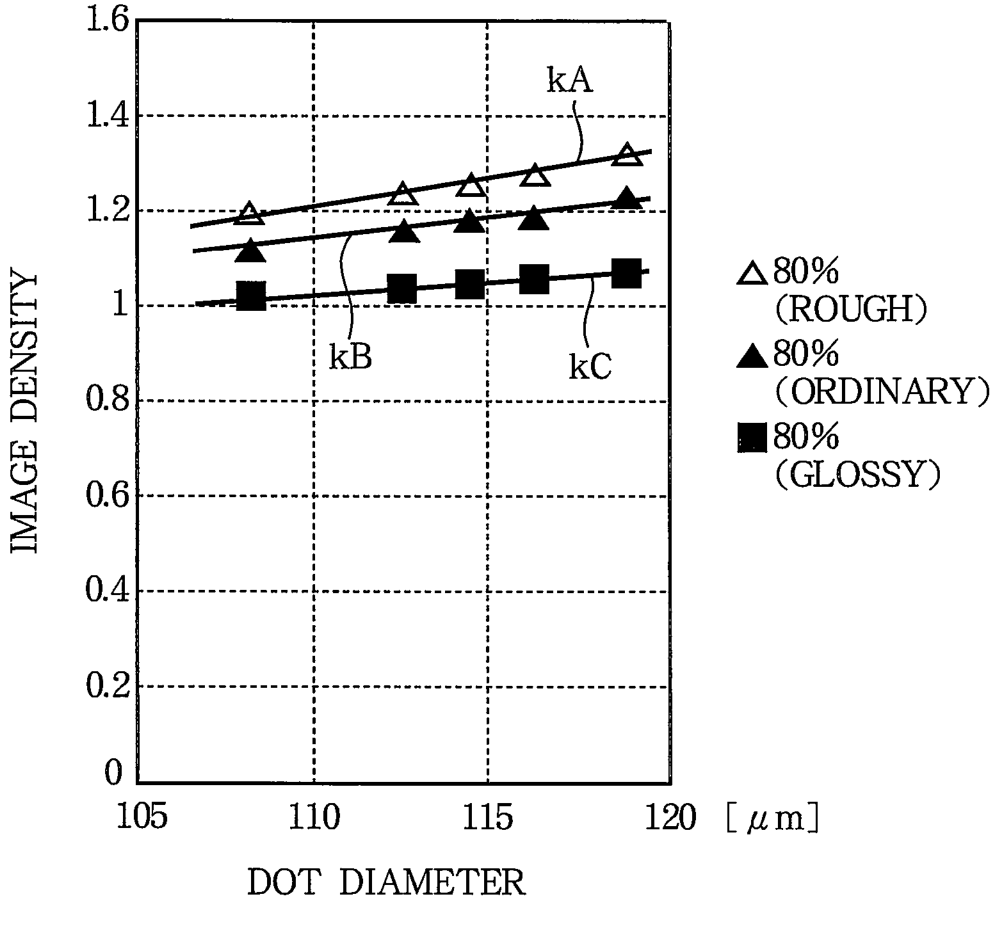
FIG. 19 is a graph illustrating correlations between dot diameter and the image density of test patterns printed on the different types of paper.

To obtain the information stored in the density/dot-diameter conversion information memory areas 113, 114, 115, an array of image patterns with differing duty ratios is printed on each of three sheets of paper: a rough sheet P1, an ordinary sheet P2, and a glossy sheet P3. These arrays are printed several times with different dot diameters, correlation coefficients are calculated, the duty ratio that gives the highest correlation coefficient is selected, and regression lines are plotted as in the first embodiment. In FIG. 19, the same duty ratio (80%) has been selected for all three types of paper, and respective regression lines kA, kB, kC have been plotted.

As shown in FIG. 19, in comparison with ordinary paper (line kB), rough paper tends to produce a higher image density even with a small dot diameter (line kA), while glossy paper (line kC) produces a lower image density even for a large dot diameter. The reason for this is that when a dot 37 is printed on rough paper P1 as in FIG. 18A, more of the toner fills surface irregularities in the paper than when a dot 38 is printed on ordinary paper P2 as in FIG. 18B, and when a dot 39 is printed on glossy paper P3 as in FIG. 18C, there are substantially no surface irregularities to be filled.

From the regression lines kA, kB, kC in FIG. 19, separate formulas relating dot diameter to image density are derived for the three types of paper. The following exemplary equations (2), (3), (4) relate dot diameter d to image density ODA on rough paper, image density ODB on ordinary paper, and image density ODC on glossy paper.

$$ODA=9.40^{-3}\times d+0.172 \quad (2)$$

$$ODB=6.60^{-3}\times d+0.430 \quad (3)$$

$$ODC=5.40^{-3}\times d+0.437 \quad (4)$$

These three formulas are stored in the three density/dot-diameter conversion information memory areas 113, 114, 115, respectively.

When a dot diameter is specified, accordingly, the reference density calculation processor reads the dot diameter and the media type memory are 111, selects one of the three density/dot-diameter conversion information memory areas 113, 114, 115 according to the type of paper being used, uses the stored formula to convert the specified dot diameter to an image density (ODA, ODB, or ODC), and stores this image density as the reference density OD1 in the reference density memory area 83.

Subsequent operations proceed as in the first embodiment. The density adjustment pattern formed on the transport belt 17 to adjust the image density is a pattern having the same duty ratio as the pattern used to derive the formula stored in the selected density/dot-diameter conversion information memory area. For the data in FIG. 19, since all three formulas are derived from an 80% pattern, only one pattern has to be stored in the test pattern memory area 78.

In a variation of the second embodiment, different formulas for deriving the image density from the dot diameter are stored according to paper properties other than surface roughness, such as the electrical resistance of the paper or the thickness of the paper, which also affect the affinity of toner 33 for the paper.

Figure 20:
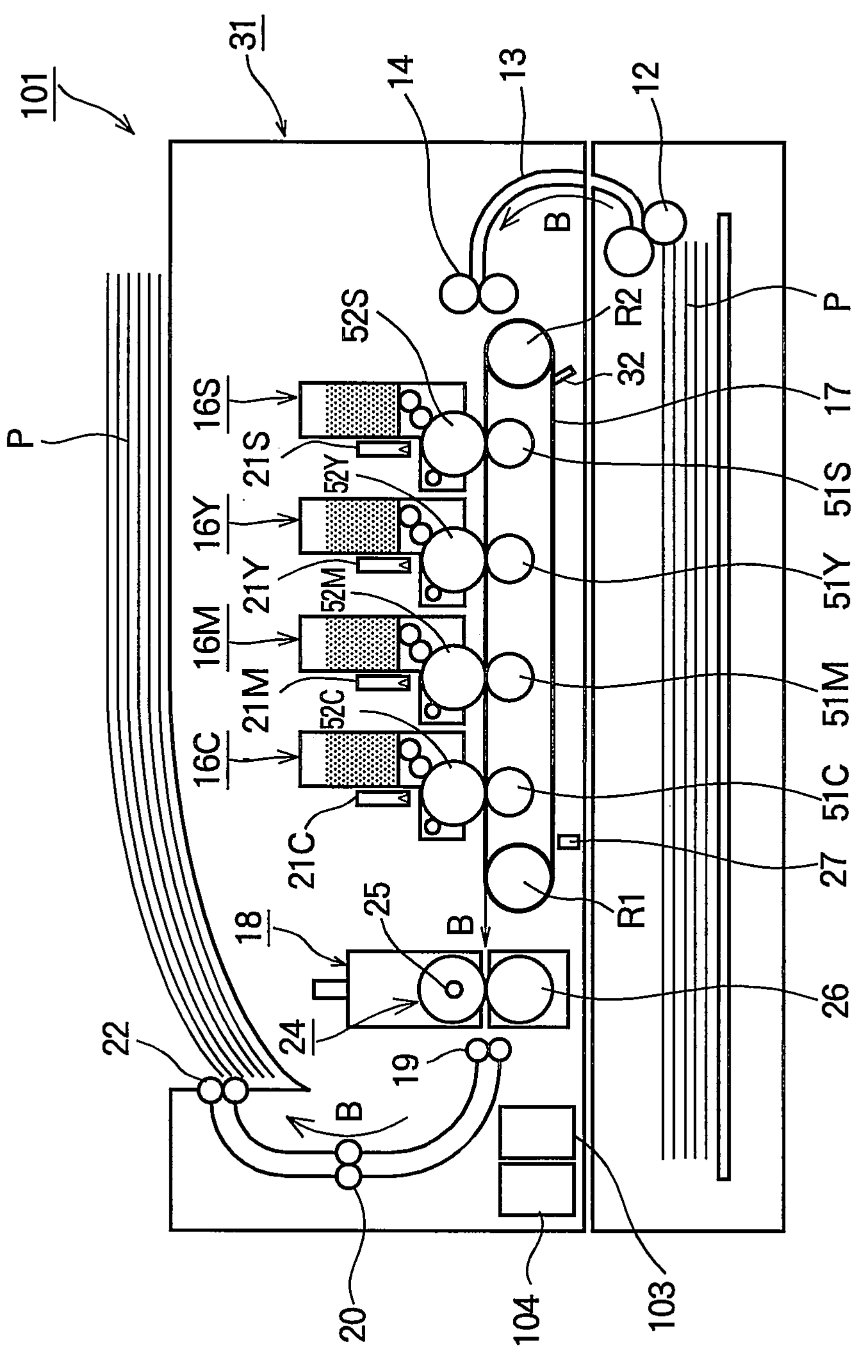
FIG. 20 is a schematic side sectional view of a printer in a third embodiment of the invention.

Next, a third embodiment of the embodiment will be described. Referring to FIG. 20, the third embodiment differs from the preceding embodiments in that one of the image forming units is a special image forming unit 16S employing an invisible toner. In the third embodiment, the special image forming unit 16S replaces the black image forming unit, and is the first image forming unit encountered by the paper as it travels through the printer 101. Since the invisible toner image is the first toner image to be transferred to the paper P or transport belt 17, invisible toner will not fail to be transferred because of the presence of toner of other colors on the paper or belt.

Figure 21:
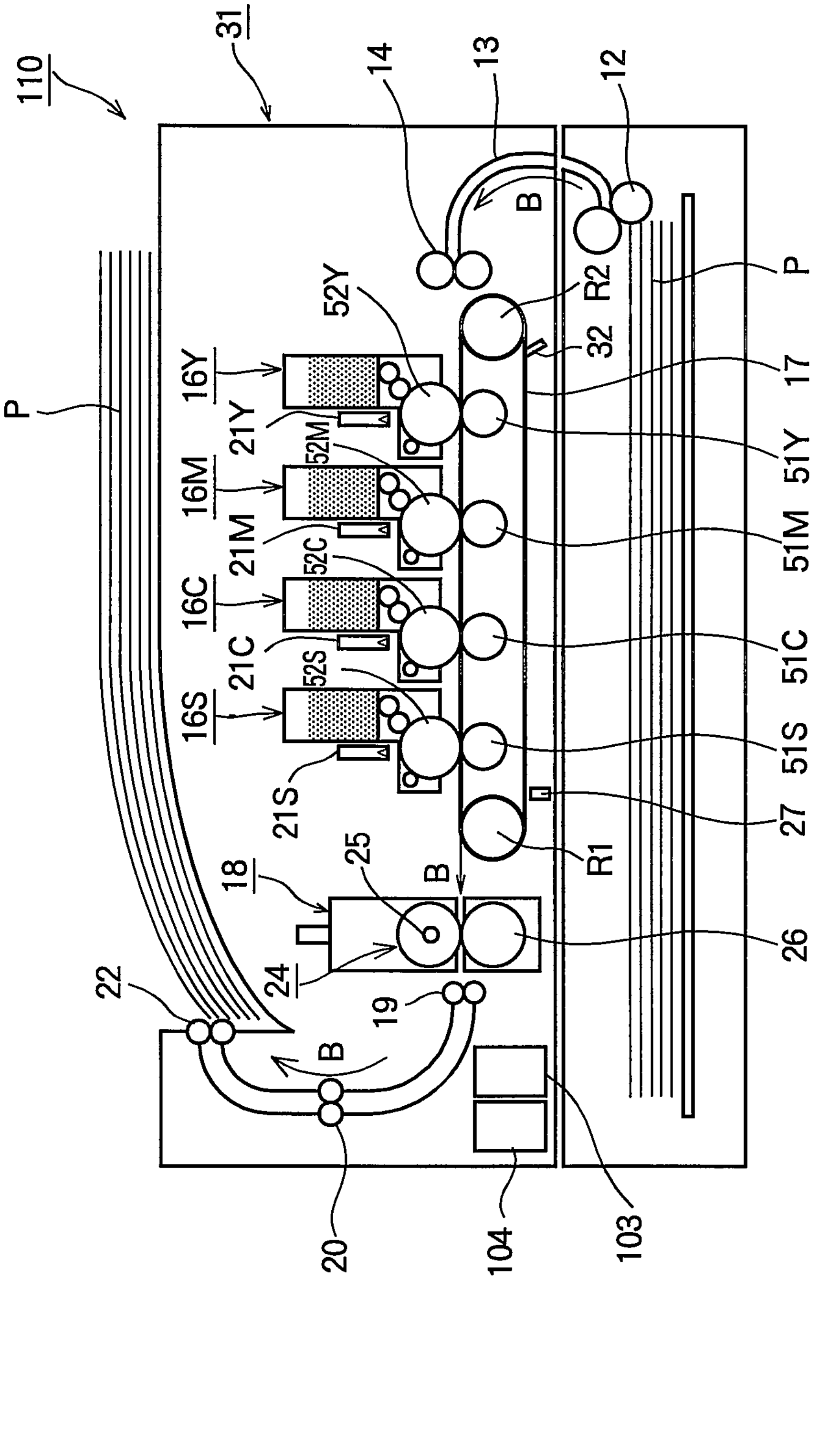
FIG. 21 is a schematic side sectional view of a variation of the printer FIG. 20.

Alternatively, the special image forming unit 16S may be placed after the other three image forming units 16Y, 16M, 16C, as shown in FIG. 21, and may be the last of the image forming units encountered by the paper P. In this case, since the invisible toner image is formed last, the density sensor 27 can detect its density accurately by directly illuminating it with infrared light.

Figure 22:
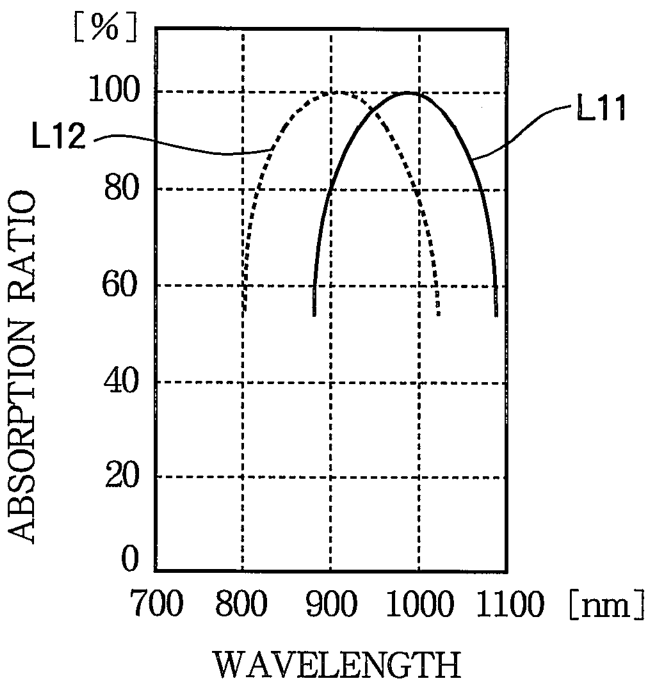
FIG. 22 is a graph illustrating spectral properties of the invisible toner used in the third embodiment.

Referring to FIG. 22, the density sensor 27 in the third embodiment emits light with a spectral distribution L11 in the near infrared region, and the invisible toner has an absorption spectrum L12 also located in the infrared region. The invisible toner is used to print invisible watermarks or other identification images that are invisible to the eye but can be detected by an infrared scanner. The image information is provided by the host computer 59.

In the third embodiment, the invisible toner includes an infrared absorbing material that absorbs light of wavelengths from 800 to 1000 nanometers (nm) without absorbing any visible light, which has wavelengths below 800 nm. Known examples of infrared absorbing materials that may be used include glass powder doped with cupric oxide (CuO), and transparent polymer materials including copper ions. Exemplary transparent polymer materials that may be used include polycarbonate, polyester, methacryl, styrene, polyvinylchloride, polyamide, and other plastic resins. Since the invisible toner does not absorb visible light, the invisible toner image cannot be seen by human eyes.

One exemplary type of invisible toner comprises a binder resin, a charge control agent, a release agent, and an inorganic infrared absorbing agent such as gallium-doped zinc oxide (e.g., Pazet GK-40, manufactured by HakusuiTech Co., Ltd. of Osaka, Japan). Gallium-doped zinc oxide is a white powder; an invisible toner incorporating gallium-doped zinc oxide looks colorless (white) when illuminated by visible light.

Another type of invisible toner employs an organic infrared absorbing agent such as Kayasorb IRG022, a diimonium dye manufactured by Nippon Kayaku Co., Ltd. of Tokyo, Japan.

Figure 23:
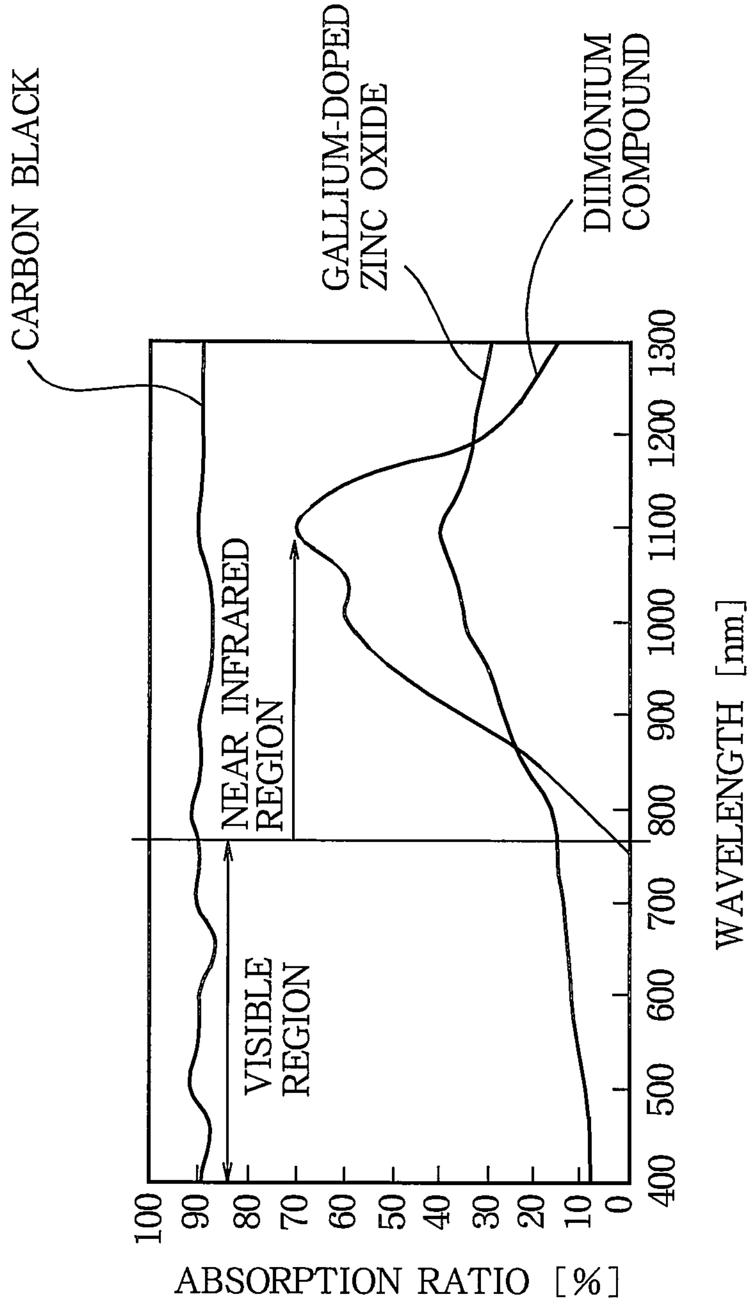
FIG. 23 is a graph showing absorption spectra of carbon black and two infrared absorbing agents.

Referring to FIG. 23, an invisible toner including gallium-doped zinc oxide or Kayasorb IRG022 diimonium dye has a peak absorption at 1100 nm. Kayasorb IRG022 diimonium dye is especially suitable for use in an invisible toner because of its particularly strong absorption (70%) at this wavelength.

Figure 24:
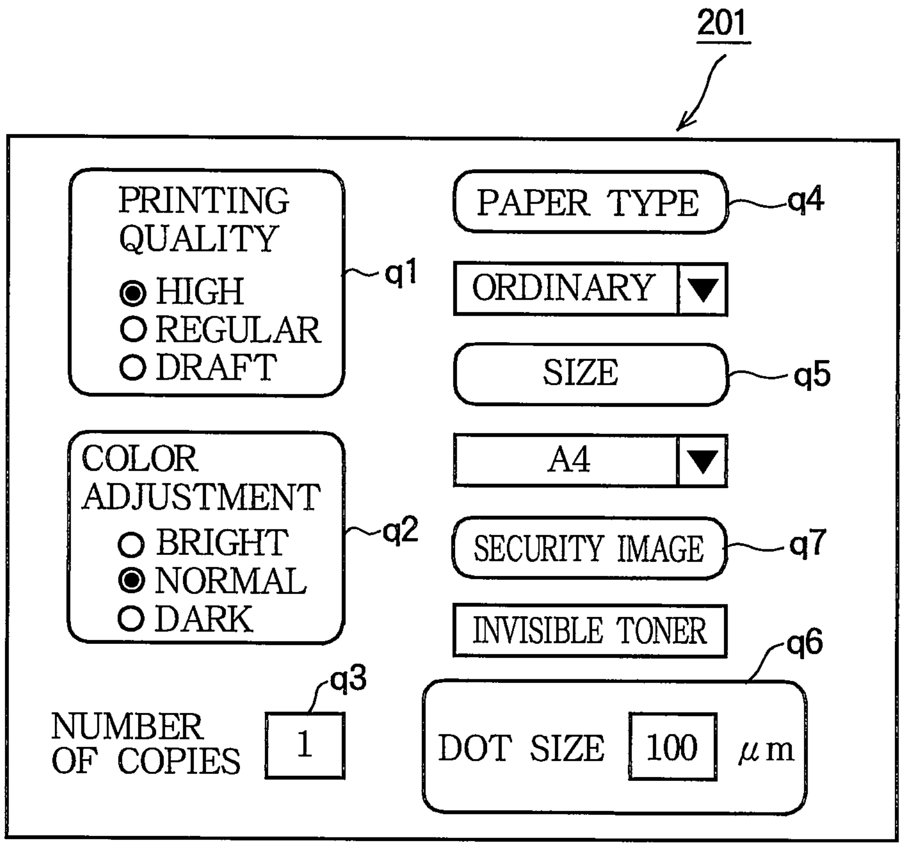
FIG. 24 illustrates a printing control selection screen used in the third embodiment.
Figure 25A:
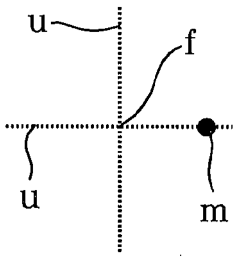
FIGS. 25A, 25B, 25C, and 25D illustrate basic patterns printed in a fourth embodiment of the invention.
Figure 25B:
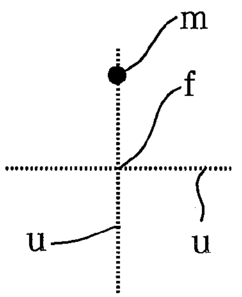
Figure 25C:
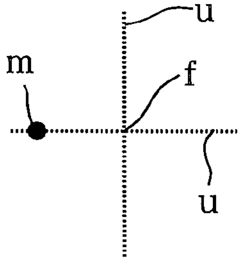
Figure 25D:
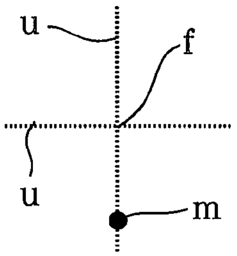

Referring to FIG. 24, the printing control selection screen 201 displayed on the display unit 302 in the third embodiment includes a security image field q7 in addition to the fields q1-16 described in the first embodiment. The operator uses the security image field q7 to select the type of developing agent (toner) to be used to print the identification image. The security image field q7 may also be termed a developing agent designation field or toner designation field.

If the operator designates the invisible toner, then the special image forming unit 16S is used to form an identification image on or beneath the normal image, which is printed by the yellow, magenta, and cyan image forming units 16Y, 16M, 16C. (Black is printed as a combination of yellow, magenta, and cyan).

The control program executed by the CPU 71 in the third embodiment includes a data discrimination module that discriminates between identification information and image data in the data received from the host computer 59 via the interface 102. Another part of the control program, in combination with the CPU 71, constitutes a first printing control unit that uses the special image forming unit 16S and its invisible toner to form an identification image based on the identification information. Still another part of the control program, in combination with the CPU 71, constitutes a second printing control unit that uses the yellow, magenta, and cyan image forming units 16Y, 16M, 16C to print the image data, using visible toner.

Both the main visible image and the invisible identification image are printed on the same sheet of paper P. The invisible identification image does not degrade the quality of the visible image. If the invisible identification image is printed as described below, it also remains undegraded and can be read accurately.

As in the first embodiment, the operator uses the keyboard 303 or another input device to specify the desired printing quality, the type of paper to be used, the image brightness, the number of copies, the size and thickness of the paper, and the dot diameter. If an identification image is to be printed, the operator also uses the security image field q7 to select the type of toner to be used.

In the third embodiment, the image quality, brightness, number of copies and so on constitute printing settings, the paper size, thickness, and type constitute media information, the dot diameter constitutes dot information, and the type of toner to be used to print the identification image constitutes developer agent information.

Next, the printing control processor in the processing unit 301, operating according to a printing control program, creates image data and identification information and sends them to the printer 101 together with the printing settings, media information, dot information, and developer agent information. In the printer 101, the image forming processor in the CPU 71 receives the image data, identification information, printing settings, media information, dot information and developer agent information as printer control information, reads necessary information from the ROM 72 and RAM 73, and forms an image according to the printer control information.

Before printing begins, the density adjustment processor adjusts the image density according to the specified dot diameter.

As in the first embodiment, the density sensor 27 detects the density of a density adjustment image formed on the transport belt 17, but the density adjustment image is formed by the special image forming unit 16S, using the invisible toner. The density sensor 27 includes a photoreflector with an infrared LED light source that emits near infrared light. As shown in FIG. 22, the peak of the spectrum L11 of the emitted near infrared light occurs at about 1000 nm, whereas the absorption peak of the invisible toner is about 900 nm.

While the density sensor 27 is well adapted for detecting the density of a visible toner image (visible toner absorbs infrared light over a broad range of wavelengths), the density sensor 27 is not as well adapted for detecting an invisible toner image, because the invisible toner is designed to have infrared absorption characteristics matched to the infrared light used in a special scanner that reads the invisible identification information.

When the density sensor 27 is used to measure the image density of a toner image formed with invisible toner, it measures a value equal to only about 85% of the density of the same image when formed with visible toner 33. For that reason, the image density OD' of the invisible toner image is calculated from the following formula:

$$OD'=(6.60^{-3}\times d+0.430)/1.18 \quad (5)$$

This formula is stored in the density/dot-diameter conversion information memory area 77 in the ROM 72 in FIG. 4.

The parameter adjustment processor may use the invisible density adjustment image and the above formula (5) to adjust a parameter or parameters applied to all of the image forming units 16S, 16Y, 16M, 16C. Alternatively, the parameter adjustment processor may apply this adjustment only to the special image forming unit 16S, and may adjust the parameters of the other image forming units 16Y, 16M, 16C separately, on the basis of a density adjustment image printed with visible toner, using a different conversion formula and possibly a different dot size.

The third embodiment is not limited to the use of an infrared absorbing material in the invisible toner. For example, an ultraviolet absorbing material may be used instead, if the density sensor 27 can operate with ultraviolet light.

In the third embodiment, invisible toner is used in place of the black toner, but in a monochrome printer, the invisible toner may be used in addition to black toner.

The preceding embodiments can be used in the barcode printing technology provided by Oki Electric Industry Co. of Tokyo, Japan to prevent unauthorized modification or forgery of documents. In this technology, when letters, numbers, and so on are printed on paper P, a special pattern of dots is also printed in the background on the paper P. Specifically an Anoto pattern of the type developed by Anoto Group of Lund, Sweden is printed.

A fourth embodiment in which this type of background pattern is printed will now be described. The fourth embodiment is generally similar to the third embodiment shown in FIG. 20.

The ROM 72 (FIG. 4) in the fourth embodiment includes memory areas that store a test pattern, identification information, and information concerning the dots with which the stored identification information or another special identification image is to be printed (dot size information). The image forming units 16S, 16Y, 16M, 16C form images on the basis, in part, of the information read from these memory areas in the ROM 72. The density/dot-diameter conversion information memory area 77 stores information relating image density to the dot information.

Figure 26:
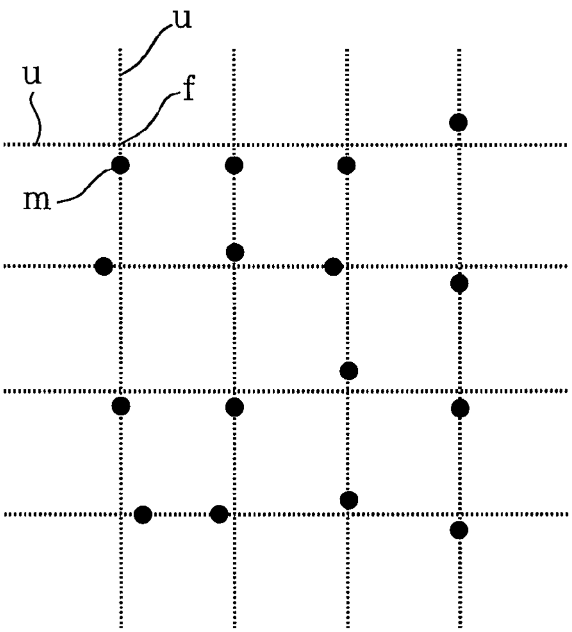
FIG. 26 illustrates an Anoto pattern printed in the fourth embodiment.

The Anoto pattern printed in the fourth embodiment consists of marks m formed near the intersections f of grid lines u as shown in FIGS. 25A to 25D. The marks m are dots with a diameter of about 0.04 millimeters (mm). The grid spacing is about 0.3 mm. The grid lines u are not printed. Information is conveyed by the direction and length of the offset of each mark from the nearby intersection in the non-printed grid. Identification information is encoded in a six-by-six matrix of marks. An exemplary four-by-four matrix is shown in FIG. 26. Accurate reading of the encoded information requires accurate control of the density with which the marks m are printed, thus requiring accurate control of individual dot size.

Printing of the marks m may be controlled from the host computer 59, in which case the dot diameter is entered on the printing control selection screen 201 displayed at the host computer 59, and the dot diameter and other information are received by the printing control program.

Alternatively, printing of the marks may be controlled from a control panel on the printer itself. An input section of the control panel may allow the operator to select whether to print a special pattern (for example, an Anoto pattern) with the invisible toner.

In either case, a predetermined dot size and predetermined printing conditions are set as default values in the test pattern memory area 78. If the operator selects printing of the special pattern of marks by the invisible toner, the necessary parameters are read from the test pattern memory area 78 and the special pattern is printed.

In a variation of the fourth embodiment, the operator can also enter separate dot sizes for the yellow, magenta, and cyan toner colors. In this case, a separate relation between dot size and image density can be stored in the density/dot-diameter conversion information memory area 77 for each type of toner. Since absorption spectral characteristics vary from toner to toner, a density sensor with an LED having a peak emission wavelength suitable for each type of toner may be provided. Alternatively, the density sensor may have a white LED and may use a diffraction grating to obtain light of the appropriate wavelength for each type of toner.

The invention is not limited to the direct transfer of toner to the paper P. A color toner image may be formed on an intermediate transfer body, then transferred to the paper P.

In the preceding embodiments, the invention was applied to a printer, but the invention may also be practiced in a copier, a facsimile machine, or a multifunction device including printing, scanning, and other functions.

Those skilled in the art will recognize that further variations are possible within the scope of the invention, which is defined in the appended claims.

What is claimed is:

1. An image forming device comprising:

an input unit for input of dot information specifying a desired size of dots in an image;

a memory unit storing a test pattern and information relating a reference density and a parameter controlling a density of the image to a size of dots in an image of the test pattern, the information being obtained by measuring a density and size of dots in the image of the test pattern;

an image forming unit for forming the image of the test pattern stored in the memory unit according to the parameter related to the size of dots corresponding to the desired size of dots specified by the dot information input by the input unit;

a density detector for detecting a density of the image formed by the image forming unit; and a processing unit for obtaining the reference density related to the size of dots corresponding to the desired size of dots specified by the dot information input by the input unit from the information stored in the memory unit, performing a comparison of the reference density with the density detected by the density detector, and adjusting the parameter according to a result of the comparison, and adjusting the density of the image by applying the adjusted parameter.

2. The image forming device of claim 1, wherein the image forming unit forms dots by exposure of an image carrier to light and the parameter determines a quantity of light per dot.

3. The image forming device of claim 2, wherein the parameter is an illumination time.

4. The image forming device of claim 1, wherein the image forming unit applies a bias voltage to a developing agent carrier, and the parameter determines the bias voltage.

5. The image forming device of claim 4, wherein the processing unit increases an absolute value of the bias voltage if the density detected by the density detector is less than the reference image density, and reduces the absolute value of the bias voltage if the density detected by the density detector is greater than the reference image density.

6. The image forming device of claim 1, wherein the memory unit stores different information relating the reference density to the dot information for different types of image forming media usable by the image forming device.

7. The image forming device of claim 6, wherein the input unit also receives input of information designating one of the different types of image forming media.

8. The image forming device of claim 6, further comprising a gloss sensor for distinguishing between the different types of image forming media by sensing their gloss.

9. The image forming device of claim 1, wherein the memory unit stores information describing a formula for calculating the reference density from the dot information.

10. The image forming device of claim 1, wherein the image forming device has a plurality of image forming units employing developing agents of different colors, said image forming unit being one of the plurality of image forming units.

11. The image forming device of claim 1, wherein the image forming unit employs a developing agent including an infrared absorbing material and a transparent polymer material that is transparent to visible light.

12. An image forming device comprising:

an input unit for receiving image data and an identification information, and for input of dot information specifying a desired size of dots in a main image according to the image data and an identification image according to the identification information;

a memory unit for storing a test pattern and information relating a reference density and a parameter controlling a density of the main image and the identification image to a size of dots in a density adjustment image of the test pattern, the information having been obtained by measuring a density and size of dots in the density adjustment image of the test pattern;

an image forming unit for forming the density adjustment image, the identification image, and the main image according to the parameter related to the size of dots corresponding to the desired size of dots specified by the dot information input by the input unit;

a density detector for detecting a density of the identification image formed by the image forming unit; and a processing unit for obtaining the reference density related to the size of dots corresponding to the desired size of dots specified by the dot information stored in the memory unit, performing a comparison of the reference density with the density detected by the density detector, and adjusting the parameter according to a result of the comparison, and adjusting the density of the main image and the identification image by applying the adjusted parameter.

13. The image forming device of claim 12, wherein the image forming unit uses an invisible developing agent to form the identification image.

14. The image forming device of claim 13, wherein the invisible developing agent includes an infrared absorbing material and a transparent polymer material that is transparent to visible light.

15. An image forming device comprising:

an input unit for receiving identification information and image data from a host device;

a first image forming unit employing an invisible developing agent absorbing light in a predetermined wavelength band;

a second image forming unit employing a visible developing agent;

a density detector for detecting a density of images formed by the first image forming unit and the second image forming unit; and a processing unit for determining a first correction to correct a size of dots formed with the invisible developing agent by the first image forming unit, adjusting an image forming parameter of the first image forming unit according to the first correction, controlling the first image forming unit to form an identification image according to the identification information, and controlling the second image forming unit to form a main image according to the image data; wherein the processing unit calculates the first correction from the density of an image formed by the first image forming unit as detected by the density detector, calculates a second correction to correct a size of dots formed by the second image forming unit from the image density of an image formed by the second image forming unit as detected by the density detector, and adjusts an image forming parameter of the second image forming unit according to the second correction; and the first correction is calculated to adjust for a difference between the detected density of the image formed by the first image forming unit and the detected density of the image formed by the second image forming unit.

16. The image forming device of claim 15, wherein the visible developing agent includes a colored material, and the invisible developing agent includes an infrared absorbing material and a transparent polymer material that is transparent to visible light.

17. The image forming device of claim 15, wherein the second image forming unit includes a plurality of image forming units employing developing agents of different colors, and the first image forming unit is disposed preceding of the second image forming unit in a direction of image forming media transport.

18. The image forming device of claim 15, wherein the second image forming unit includes a plurality of image forming units employing developing agents of different colors, and the first image forming unit is disposed following the second image forming unit in a direction of image forming media transport.

19. The image forming device of claim 15, wherein:

the input unit receives input of dot information concerning a size of dots; and the processing unit determines the first correction according to the dot information.

20. The image forming device of claim 19, wherein:

the input unit receives input of printing settings including a printing resolution; and the processing unit determines the first correction according to the dot information and the printing settings.

21. The image forming device of claim 20, wherein:

the input unit receives input of media information; and the processing unit determines the first correction according to the dot information, the printing settings, and the media information.

22. The image forming device of claim 1, wherein the processing unit executes a process of setting the adjusted parameter to the image forming unit, causing the image forming unit to form the image of the test pattern according to the adjusted parameter, causing the density detector to detect the density of the image formed by the image forming unit according to the adjusted parameter, performing the comparison, and adjusting the adjusted parameter according to the result of the comparison.

23. The image forming device of claim 22, wherein the processing unit repeats the process until the result of the comparison indicates that the density detected by the density detector is equal to the reference density.

24. The image forming device of claim 12, wherein the processing unit executes a process of setting the adjusted parameter to the image forming unit, causing the image forming unit to form the density adjustment image of the test pattern according to the adjusted parameter, causing the density detector to detect the density of the image formed by the image forming unit according to the adjusted parameter, performing the comparison, and adjusting the adjusted parameter according to the result of the comparison.

25. The image forming device of claim 24, wherein the processing unit repeats the process until the result of the comparison indicates that the density detected by the density detector is equal to the reference density.

* * * * *